United States Patent
Berg et al.

(10) Patent No.: US 10,817,271 B2
(45) Date of Patent: Oct. 27, 2020

(54) AUTOMATED DEPENDENCY ANALYZER FOR HETEROGENEOUSLY PROGRAMMED DATA PROCESSING SYSTEM

(71) Applicant: Ab Initio Technology LLC, Lexington, MA (US)

(72) Inventors: Christophe Berg, Sudbury, MA (US); David Clemens, Cambridge, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 16/512,160

(22) Filed: Jul. 15, 2019

(65) Prior Publication Data
US 2019/0339952 A1 Nov. 7, 2019

Related U.S. Application Data

(63) Continuation of application No. 15/601,911, filed on May 22, 2017, now Pat. No. 10,379,825.

(51) Int. Cl.
*G06F 9/44* (2018.01)
*G06F 8/41* (2018.01)
*G06F 16/901* (2019.01)

(52) U.S. Cl.
CPC .......... *G06F 8/433* (2013.01); *G06F 16/9024* (2019.01)

(58) Field of Classification Search
None
See application file for complete search history.

(56) References Cited

U.S. PATENT DOCUMENTS 4,914,585 A 4/1990 Packard et al.
5,826,256 A * 10/1998 Devanbu .................. G06F 8/30
(Continued)

FOREIGN PATENT DOCUMENTS

JP 2002-099561 A 4/2002
JP 2008-027454 A 2/2008
(Continued)

OTHER PUBLICATIONS

U.S. Appl. No. 15/601,911, filed May 22, 2017, Berg et al.
(Continued)

*Primary Examiner* — Anna C Deng
(74) *Attorney, Agent, or Firm* — Wolf, Greenfield & Sacks, P.C.

(57) ABSTRACT

A dependency analyzer for a data processing system comprising at least one computer hardware processor configured to generate dependency information among variables, which may appear in any of multiple programs written in different source languages. The data processing system may parse each program, regardless of the language in which the module was written. Parsed information about each program may be recorded in a first-type data structure and then may be converted to a format representing dependencies among variables. Dependency information for each of the plurality of programs may be expressed as a combination of language independent constructs, which may be processed together, to generate dependency information for the data processing system. The dependency information may be recorded in a dependency data structure and further used for operations, such as data quality checking and change control for the data processing program.

25 Claims, 9 Drawing Sheets

(56) References Cited

U.S. PATENT DOCUMENTS

| | | | |
|---|---|---|---|
| 5,832,271 | A | 11/1998 | Devanbu |
| 5,966,072 | A | 10/1999 | Stanfill et al. |
| 6,745,384 | B1 * | 6/2004 | Biggerstaff ........... G06F 8/4441 712/203 |
| 6,988,183 | B1 * | 1/2006 | Wong ................ G06F 9/30174 712/208 |
| 7,174,536 | B1 * | 2/2007 | Kothari ............... G06F 11/3664 717/105 |
| 7,555,742 | B2 * | 6/2009 | Iborra ....................... G06F 8/30 717/101 |
| 7,685,083 | B2 | 3/2010 | Fairweather |
| 7,707,566 | B2 * | 4/2010 | Grover ..................... G06F 8/20 717/103 |
| 7,734,619 | B2 | 6/2010 | Vierich et al. |
| 8,775,476 | B2 | 7/2014 | Henderson |
| 9,063,998 | B2 | 6/2015 | Kozina et al. |
| 9,256,656 | B2 | 2/2016 | Fankhauser et al. |
| 9,430,583 | B1 | 8/2016 | Flake |
| 9,563,411 | B2 | 2/2017 | Roberts |
| 9,712,554 | B2 | 7/2017 | Hassanzadeh et al. |
| 9,753,926 | B2 | 9/2017 | Flake et al. |
| 9,875,241 | B2 | 1/2018 | Bator et al. |
| 10,025,878 | B1 | 7/2018 | Lefever et al. |
| 10,110,415 | B2 | 10/2018 | Radivojevic et al. |
| 10,175,974 | B2 | 1/2019 | Bach et al. |
| 10,313,177 | B2 | 6/2019 | Radivojevic et al. |
| 2004/0010752 | A1 | 1/2004 | Chan et al. |
| 2004/0255277 | A1 | 12/2004 | Berg et al. |
| 2004/0268307 | A1 * | 12/2004 | Plesko ....................... G06F 8/20 717/114 |
| 2005/0262488 | A1 * | 11/2005 | Wagner ..................... G06F 8/71 717/144 |
| 2007/0011668 | A1 | 1/2007 | Wholey et al. |
| 2007/0061353 | A1 | 3/2007 | Bobbin et al. |
| 2007/0112714 | A1 | 5/2007 | Fairweather |
| 2007/0234288 | A1 | 10/2007 | Lindsey et al. |
| 2008/0183378 | A1 | 7/2008 | Weidner |
| 2009/0178031 | A1 | 7/2009 | Zhao |
| 2009/0216728 | A1 | 8/2009 | Brainerd et al. |
| 2010/0023926 | A1 | 1/2010 | Sugawara et al. |
| 2010/0114962 | A1 | 5/2010 | Ahadian et al. |
| 2010/0138420 | A1 | 6/2010 | Bator et al. |
| 2010/0138431 | A1 | 6/2010 | Bator et al. |
| 2011/0302563 | A1 | 12/2011 | Li |
| 2011/0320460 | A1 | 12/2011 | Fankhauser et al. |
| 2012/0179726 | A1 | 7/2012 | Roberts |
| 2012/0209886 | A1 | 8/2012 | Henderson |
| 2012/0259793 | A1 | 10/2012 | Umansky et al. |
| 2012/0271867 | A1 | 10/2012 | Grossman et al. |
| 2013/0091133 | A1 | 4/2013 | Hashimoto et al. |
| 2013/0283250 | A1 | 10/2013 | Eichenberger et al. |
| 2013/0290828 | A1 | 10/2013 | Flake et al. |
| 2014/0013304 | A1 | 1/2014 | Vangala et al. |
| 2014/0019423 | A1 | 1/2014 | Liensberger et al. |
| 2014/0019949 | A1 | 1/2014 | Craymer |
| 2014/0280362 | A1 | 9/2014 | Henderson |
| 2015/0012314 | A1 | 1/2015 | Mohammad et al. |
| 2015/0058278 | A1 | 2/2015 | Fankhauser et al. |
| 2015/0081701 | A1 | 3/2015 | Lerios et al. |
| 2015/0128114 | A1 | 5/2015 | O'Hara et al. |
| 2016/0019057 | A1 | 1/2016 | Bach et al. |
| 2016/0019286 | A1 | 1/2016 | Bach et al. |
| 2016/0028580 | A1 | 1/2016 | Radivojevic et al. |
| 2016/0232229 | A1 | 8/2016 | Radivojevic |
| 2016/0232230 | A1 | 8/2016 | Radivojevic |
| 2016/0301709 | A1 | 10/2016 | Hassanzadeh et al. |
| 2016/0308712 | A1 | 10/2016 | Azriel et al. |
| 2017/0033971 | A1 | 2/2017 | Radivojevic et al. |
| 2017/0154087 | A1 | 6/2017 | McClure et al. |
| 2018/0336020 | A1 | 11/2018 | Berg et al. |

FOREIGN PATENT DOCUMENTS

| | | |
|---|---|---|
| JP | 2012-510689 A | 5/2012 |
| JP | 2012-221502 A | 11/2012 |
| WO | WO 2014/062278 A1 | 4/2014 |

OTHER PUBLICATIONS

U.S. Appl. No. 15/040,082, filed Feb. 10, 2016, Radivojevic.
U.S. Appl. No. 15/040,162, filed Feb. 10, 2016, Radivojevic.
U.S. Appl. No. 15/293,490, filed Oct. 14, 2016, Radivojevic et al.
International Search Report and Written Opinion for International Application No. PCT/US2016/017246, dated Apr. 25, 2016.
International Search Report and Written Opinion for International Application No. PCT/US2016/017263, dated May 3, 2016.
International Search Report and Written Opinion for International Application No. PCT/US2015/041452, dated Oct. 19, 2015.
International Search Report and Written Opinion for International Application No. PCT/US2018/033882, dated Nov. 6, 2018.
[No Author Listed] AquaLogic Data Services Platform: Administration Guide. BEA Systems Inc. 2005, 79 pages.
[No Author Listed] Oracle® Warehouse Builder: Concepts, 11g Release 2 (11.2). Oracle. 2000, 154 pages.
[No Author Listed] Oracle® Warehouse Builder: Installation and Administration Guide, 11g Release 1 (11.1) for Windows and UNIX. 2000, 198 pages.
Anand et al., Exploring scientific workflow provenance using hybrid queries over nested data and lineage graphs. International Conference on Scientific and Statistical Database Management (SSDBM). 2009:237-54.
Todd et al., Scientific lineage and object-based storage systems. 2009 5th IEEE International Conference on E-Science Workshops. Dec. 9, 2009:pp. 52-58.

* cited by examiner

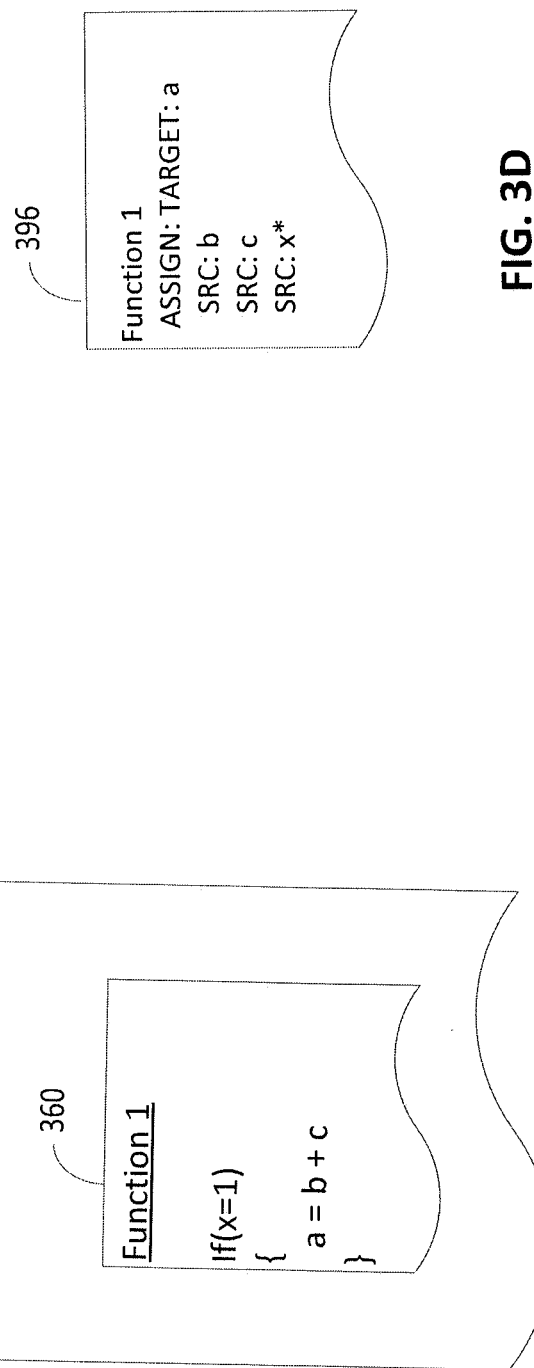

AUTOMATED DEPENDENCY ANALYZER FOR HETEROGENEOUSLY PROGRAMMED DATA PROCESSING SYSTEM

CROSS REFERENCES TO RELATED APPLICATIONS

This application claims the benefit under 35 U.S.C. § 120 as a continuation of U.S. application Ser. No. 15/601,911, filed May 22, 2017, entitled "Automated Dependency Analyzer For Heterogeneously Programmed Data Processing System," the entire contents of which is incorporated herein by reference in its entirety.

BACKGROUND

Large amounts of data is often managed through a data processing system. The data processing system may be implemented on one or more computers coupled to one or more data sources. The computers may be configured to perform specific data processing operations through use of software programs. Those software programs may be heterogeneous, written in multiple programming languages.

As an example, a university may process student registrations with a data processing system that receives as input data from students as they request classes. That data may include a student name or identification number, a course title or number, a professor and other information about the student or the course. The processing system may be programmed to process each request by accessing various data sources, such as a data store containing information about each enrolled student. The data processing system may access this data store to determine that the request to enroll in a class is made by a student in good standing. Another data store may contain information about the class, including prerequisite classes. The data processing system may access this data, in combination with data from another data store indicating classes already completed by the student requesting a class, to make a determination of whether the student is qualified to enroll in the requested class.

By processing the accessed data in accordance with a program, the data processing system may generate data indicating that the student is enrolled in the requested class and that the class roster includes that student. When the data processing system completes processing of the class registration request, the data processing system may have accessed many data sources and may have entered or changed data in multiple data stores.

A similar pattern occurs in many other important applications, with the data processing system accessing multiple data sources and generating or changing values stored in other data stores based on data accessed from the data sources or based on the values of other variables. Accordingly, many values of variables may depend on the values of other variables, whether those other values are accessed from a data source or exist within the data processing system.

It is often useful for a data processing system to provide dependency information about the data elements generated or modified by the data processing system. Ab Initio of Lexington, Mass., USA provides a "cooperating system" that provides dependency information based on programs created to execute on the cooperating system. The cooperating system executes programs expressed as data flow graphs, represented as operators and data flows between operators. A tool may analyze the graph and determine dependencies among variables by identifying an operator in which the value of a variable is set based on the values of one or more other variables. By tracing back the flows into the operator, the tool may identify other variables on which the variables input to the operator in turn depend. By tracing through the graph, the tool may identify all the dependencies, whether direct or indirect, for any variable.

This dependency information may be entered into a metadata store from which it can be used for many functions involving the graph. For example, data quality rules may be applied to identify variables with unexpected patterns of values. Those variables, as well as any variable within the graph that has a dependency on those variables, may be flagged as suspicious. As another example, if a portion of the graph needs to be changed to provide a new functionality, correct an error, or remove functionality that is no longer desired, other portions of the graph that depend, through the variables generated or modified in that processing, may be readily identified. Following the change, those portions of the graph may be scrutinized to ensure that their function is not compromised by changes made elsewhere in the graph.

In some instances, a data processing system may use other programming languages instead of or in addition to a graph. For example, a data source may be a data base that is programmed in SQL or a programming language defined by the supplier of the database to enable a user to program queries to be run against that database. In a data processing system as might be implemented in a large company, there may be multiple programs written in multiple languages instead of or in addition to a graphical programming language. Dependency analysis tools that operate on programs expressed as graphs do not process these programs written in other languages. As a result, dependency information for the entire data processing system may be incomplete or may require significant effort to generate.

SUMMARY

Some embodiments provide for a dependency analyzer for use with a data processing system configured to execute programs in any of multiple computer programming languages that access a plurality of records comprising fields. The dependency analyzer may be configured for dependency analysis of programs in the multiple computer programming languages, and the dependency analysis may comprise computing dependency information relating to field-level lineage across computer programs in the multiple computer languages. The dependency analyzer may comprise a front end configured to process a plurality of programs controlling the data processing system. The plurality of programs may be written in a plurality of programming languages of the multiple programming languages. The front end may comprise a plurality of front end modules, each front end module configured to receive as input a computer program of the plurality of programs written in a programming language of the plurality of programming languages and to output a language-independent data structure representing dependencies on fields of the data processing system created within the program, wherein, said language-independent data structure is comprised of one or more dependency constructs, wherein each dependency construct includes an indication of at least one field and a dependency related to the at least one field. The data analyzer may also comprise a back end configured to receive language independent data structures from the plurality of front end modules and to output dependency information for the data processing system representing dependencies created within the plurality of programs. The dependency information may comprise field-level dependencies introduced in multiple programs of the plurality of programs such that the dependency information comprises field-level lineage across the plurality of programs.

Some embodiments provide a dependency analyzer for use with a data processing system comprising at least one computer hardware processor and at least one non-transitory computer-readable storage medium storing processor executable instructions that, when executed by the at least one computer hardware processor, cause the at least one computer hardware processor to perform acts that include, for each of a plurality of programs configured for execution by the data processing system, constructing a first data structure based on parsing the program, wherein the first data structure reflects operations in the program. For each of a plurality of the first data structures, operations reflected in the first data structure that impact a dependency on one or more data elements may be selected, such that operations that do not impact a dependency are not selected. For each selected operation, an indication of the selected operation may be recorded in a second data structure by recording dependency constructs from a set of dependency constructs. The set of dependency constructs, for each of the plurality of programs, may be independent of a language in which the program is written. The plurality of second data structures may be processed. That processing may comprise identifying control flow or data flow dependencies on data elements, said dependencies being those that would arise during execution of any of the plurality of programs. The identified dependencies in a dependency data structure may be processed, and the dependency data structure may comprise data indicating data elements in the plurality of programs structured so as to indicate dependencies between the data elements.

Some embodiments provide for a method of operating a dependency analyzer configured for use with a data processing system, comprising: using at least one computer hardware processor to perform, for a plurality of programs configured for execution within the data processing system and specifying data processing operations in programming languages, wherein the plurality of programs use a plurality of programming languages; constructing a respective first data structure for the plurality of programs by parsing the programs. For each of a plurality of the first data structures, the method may comprise selecting operations reflected in the first data structure that impact a dependency on one or more data elements; and for each selected operation, recording in a second data structure an indication of the selected operation, wherein the indications are recorded in the second data structure using a set of dependency constructs that is common to all of the second data structures. The second data structures may be processed, wherein the processing comprises identifying control flow or data flow dependencies on data elements that would arise during execution of any of the plurality of programs. The identified dependencies may be recorded in a dependency data structure.

Some embodiments may provide for a method of operating a dependency analyzer for use in conjunction with a data processing system, the method comprising: using at least one computer hardware processor to perform, for a plurality of programs specifying data processing operations within the data processing system in programming languages, wherein the plurality of programs use a plurality of programming languages; and constructing respective first data structures for the plurality of programs by parsing the programs. For each of a plurality of the first data structures, the method may comprise selecting operations reflected in the first data structure that impact a control flow dependency on one or more data elements. For each selected operation, an indication of the selected operation may be recorded in a second data structure, wherein the indications are recorded in the second data structure using a set of dependency constructs that is common to all of the second data structures. The second data structures may be processed, wherein the processing comprises identifying dependencies on data elements as a result of processing in any of the plurality of programs. The identified dependencies in a dependency data structure.

Yet further embodiments may provide for at least one non-transitory computer-readable storage medium storing processor executable instructions that, when executed by at least one computer hardware processor, cause the at least one computer hardware processor to perform acts, for a plurality of programs specifying data processing operations in respective programming languages, wherein the plurality of programs use a plurality of programming languages. The acts comprise constructing a respective first data structure for the plurality of programs by parsing the programs. For each of a plurality of the constructed first data structures, operations reflected in the first data structure that impact a control flow or a data flow dependency on one or more data elements may be extracted from the first data structure and the extracted operations may be recorded in a second data structure, wherein the indications of the extracted operations are recorded in the second data structure using a set of dependency constructs that is common to all of the second data structures. The second data structures may be processed, wherein the processing comprises identifying dependencies on data elements as a result of processing in any of the plurality of programs. The identified dependencies may be recorded in a dependency data structure.

Yet other embodiments may provide for dependency analyzer for use with a data processing system, the dependency analyzer comprising: means for constructing a first data structure representing each of a plurality of programs, wherein the first data structures reflect operations in respective programs of the plurality of programs; means for recording in a second data structure indications of operations in the first data structure that impact a control flow or a data flow dependency such that information about operations in each of the plurality of the constructed first data structures that do not impact a dependency are omitted from the second data structure; means for processing the second data structures to identify control flow or a data flow dependencies on data elements as a result of execution of operations in any of the plurality of programs; and means for recording in a dependency data structure the identified dependencies.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 3B is a conceptual sketch of a portion of a computing program;

FIG. 3D is a conceptual sketch of a dependency information extracted from a parse tree.

DETAILED DESCRIPTION

Figure 1A:
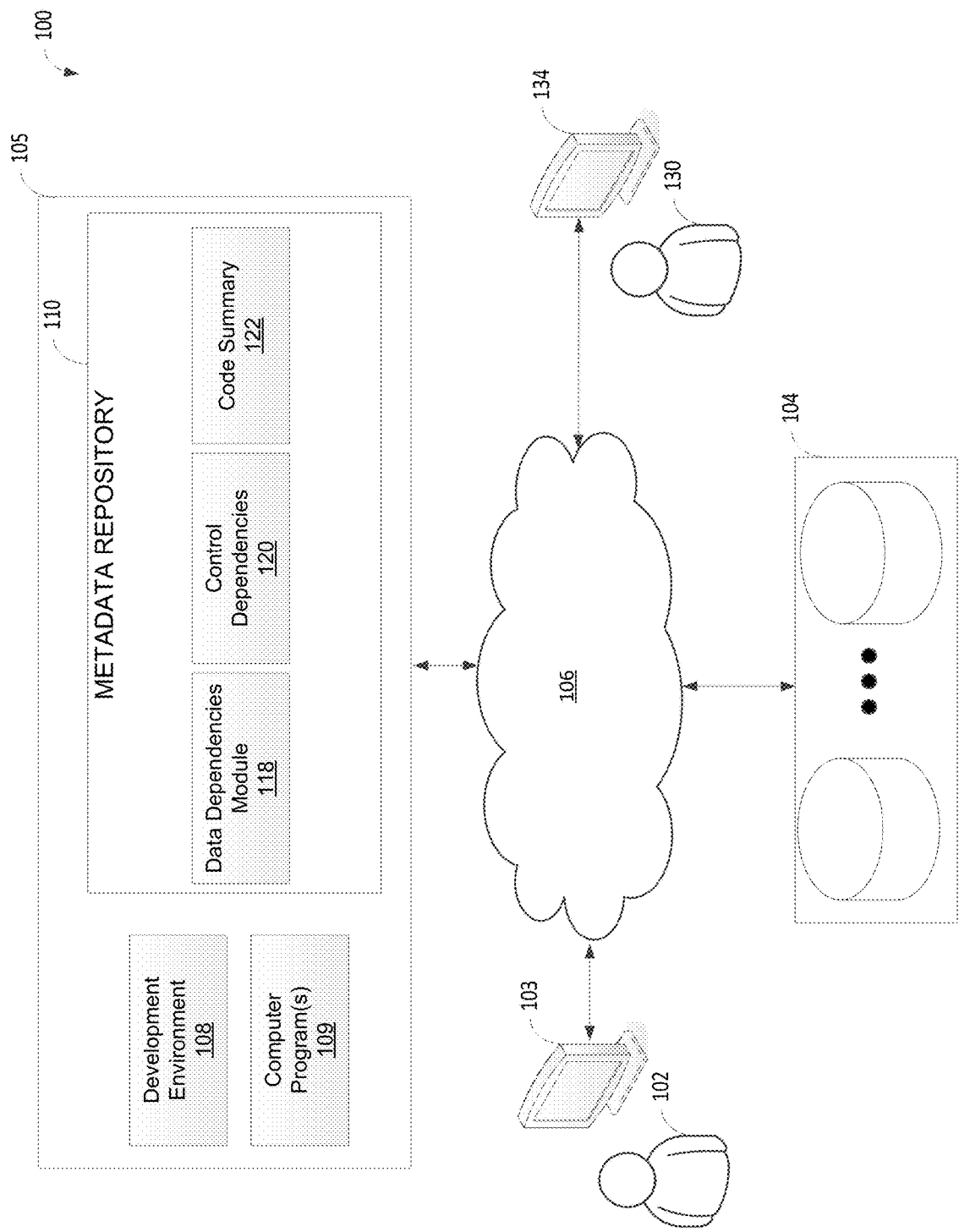
FIG. 1A is a block diagram of an illustrative computing environment, in which some embodiments of the technology described herein may operate.

The inventors have recognized and appreciated that accuracy, efficiency, and reliability of a data processing system may be improved by automatic transformation of source code representing programs for a data processing system, into a combination of language-independent constructs representing data dependencies. The constructs generated for the programs, whether expressed as graphs or in other forms, may be combined in a data structure capturing dependencies for portions of the system encompassing programs prepared in different languages, and potentially for the entire system. That data structure may then be processed to generate dependency information for the system, including programs coded in multiple languages such as graphs and one or more other languages. Such an approach leads to an improved dependency analysis tool that generates more complete dependency information for data managed by the data processing system.

In some embodiments, a set of constructs may be used to represent dependencies. The inventors have recognized and appreciated that useful information about dependencies on data elements in a data processing system may be represented by a finite set of dependency constructs. That set of constructs may include, for example, constructs representing assignment, procedure definition, procedure return, a procedure call site, conditional control flow in an "if . . . else" format, and conditional control flow in a "while . . . do" format. In some embodiments, the set of dependency constructs will consist of this set or will consist essentially of this set, containing only variations of these constructs, such as assignment of a constant value.

The inventors have further recognized and appreciated that automated processing of the source code representing portions of the program may be performed efficiently in multiple stages. A first stage processing may parse the source code. The parsed source code may be represented in a first data structure, such as a parse tree, that can be manipulated by a computer. In some embodiments, the first stage processing may be performed using commercially available tools such as a parser generator. An example of a commercially available parser generators are Yacc and ANTLR. Either of these may generate a parser from a grammar file specifying the grammar of the programming language.

A parser is language dependent and is generated from grammar rules of the language, often by a parser generator. Accordingly, a data processing system configured to identify dependencies in programs written in multiple languages may contain multiple parsers and/or a parser generator to generate multiple parsers. The data processing system therefore may have access to multiple parsers and may select, and generate if necessary, a parser for each program based on the programming language in which the program is written.

A second stage processing may extract from the parse tree or other data structure produced in the first stage information relating to dependencies. That dependency information may be expressed as a combination of constructs. The constructs may be selected from a set as described above or from any other suitable set of constructs. The result of the processing may be expressed in a second computer data structure, which may also be formatted as a tree. However, it should be appreciated that the results of the second stage processing may be stored in any data structure that retains information about the operations performed by a program that could impact dependencies based on data elements in or accessed by the program.

Processing at the second stage is also language dependent. Different languages may support different operations, which may impact dependencies in different ways. Accordingly, the tool applied to each of the first data structures may be selected for the programming language of the program being processed. A data processing system, for example, may have multiple tools for second stage processing and an appropriate tool may be selected for each program. The selection may be made dynamically by the data processing system to match a tool to the language in which the program being processed was written.

Each of the tools for second stage processing may be implemented in any suitable way. In some embodiments, each tool may be programmed to recognize, in a first data structure, operations impacting dependencies based on data elements. Frequently, these dependencies will be of one program variable, sometimes called a target variable, on one or more other program variables, sometimes called source variables. This type of data flow dependency is used as an example herein. However, it should be appreciated that other types of dependencies are possible and may be analyzed using the techniques described herein. For example, control flow dependencies are also possible, in which execution of a block of code depends on the values of one or more data elements.

In an example in which the first data structure is a parse tree, a tool may traverse the parse tree to generate the second data structure. Upon detecting an operation that impacts dependencies, the tool may make an entry in the second data structure using one or more constructs from the set of constructs. In this example, hierarchical information, reflecting ordering of operations, may be carried over to the second data structure. The tool may make no entry in the second data structure for operations reflected in the first data structure that do not impact dependencies. In this way, the second data structure is more compact than the first data structure.

Once a second data structure is computed for each program, the second data structures for the programs used together in a data processing system may be used together. The second data structures may identify which variables depend on other variables. This information may be represented as transformations, defining for each operation introducing a dependency, a target variable that is impacted by the operation and source variables from which data used in that transformation was obtained.

The second data structure representing the dependencies of the system may be processed by a dependency analysis tool. Each target recorded in the second data structure may be identified and the source variables for that target may be listed. In accordance with some embodiments, programs may have nested scopes, such as may occur when functions, or other constructs defining inner blocks of code, are defined within programs or other constructs defining outer blocks of code. In some embodiments, dependencies may exist only within an inner scope such that those dependencies do not impact a variable that is output or modified by the data processing systems. Such purely local dependencies may be deleted, leaving only external dependency information in some embodiments.

In some embodiments, a first external variable may depend on local variables, which in turn depend on one or more second external variables. In this scenario, the indirect dependency of the first external variable on the one or more second external variables may be identified in the second stage processing. Such an identification may be made automatically by having the dependency analysis tool propagate local dependencies, recasting the dependency of the first external variable on the internal variables as a dependency of the one or more second external variables on which the local variables depend.

Regardless of the specific content, this information on data dependencies may be written into a metadata structure, such as a metadata repository used by the data processing system. The information may be written in combination with any other suitable information. In some embodiments, for example, information about the source code for a program may be captured along with information characterizing dependencies of that program. As a specific example, portions of the code containing statements in which dependencies are created, may be stored.

As an example of other types of information that may optionally be stored in some embodiments, information about control dependencies may be stored. Control dependencies may be identified by identifying blocks of a program that are conditionally executed depending on the value of one or more variables. This information may be captured analogously to data dependency information but, rather than recording a variable as a target entity that depends directly on other source variables, the block of code may be identified as dependent on one or more flow control source variables. Any variable that has a value that may depend on whether that block of code is executed may be identified as a target variable and associated with those flow control source variables.

The dependency information may be used in any of a number of ways. During operation of the data processing system, for example, having dependency information may be used in evaluating rules that may enable or block processing operations on certain data. Operations receiving as an input, data that depends on variables that have been identified as corrupt or unreliable may be suppressed, as one example.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1A is a block diagram of an illustrative computing environment 100, in which some embodiments of the technology described herein may operate. Computing environment 100 includes data processing system 105, which is configured to operate on data stored in data store 104.

In some embodiments, data store 104 may include one or multiple storage devices storing data in one or more formats of any suitable type. For example, the storage device(s) part of data store 104 may store data using one or more database tables, spreadsheet files, flat text files, and/or files in any other suitable format (e.g., a native format of a mainframe). The storage device(s) may be of any suitable type and may include one or more servers, one or more database systems, one or more portable storage devices, one or more non-volatile storage devices, one or more volatile storage devices, and/or any other device(s) configured to store data electronically. In some embodiments, data store 104 may include one or more online data streams in addition to or instead of storage device(s). Accordingly, in some embodiments, data processing system 105 may have access to data provided over one more data streams in any suitable format.

In embodiments where data store 104 includes multiple storage devices, the storage devices may be co-located in one physical location (e.g., in one building) or distributed across multiple physical locations (e.g., in multiple buildings, in different cities, states, or countries). The storage devices may be configured to communicate with one another using one or more networks such as, for example, network 106 shown in FIG. 1A.

In some embodiments, the data stored by the storage device(s) may include one or multiple data entities such as one or more files, tables, data in rows and/or columns of tables, spreadsheets, datasets, data records (e.g., credit card transaction records, phone call records, and bank transaction records), fields, variables, messages, and/or reports. The storage device(s) may store thousands, millions, tens of millions, or hundreds of millions of data entities. Each data entity may include one or multiple data elements.

As described herein, a data element may be any data element stored and/or processed by a data processing system. For example, a data element may be a field in a data record, and the value of the data element may be the value stored in the field of the data record. As a specific non-limiting example, a data element may be a field storing a caller's name in a data record storing information about a phone call (which data record may be part of multiple data records about phone calls made by customers of a telecommunications company) and the value of the data element may be the value stored in the field. As another example, a data element may be a cell in a table (e.g., a cell occurring at a particular row and column of the table) and the value of the data element may be the value in the cell of the table. As yet another example, a data element may be a variable (e.g., in a report) and the value of the physical element may be value of the variable (e.g., in a particular instance of the report). As a specific non-limiting example, a data element may be a variable in a report about a bank loan applicant representing the applicant's credit score, and the value of the data element may be the numeric value of the credit score (e.g., a numeric value between 300 and 850). The value of the data element representing the applicant's credit score may change depending on the data used to generate the report about the bank loan applicant.

In some embodiments, a data element may take on a value of any suitable type. For example, a data element may take on a numeric value, an alphabetic value, a value from a discrete set of options (e.g., a finite set of categories), or any other suitable type of value, as aspects of the technology described herein are not limited in this respect. These values may be assigned through processing on the computer that has access to data store 104.

Data processing system 105 may be programmed with a "cooperating system" or other suitable program that enables the data processing system to execute programs, which may be written configure the data processing system 105 for a particular enterprise, based on the type of data processing that enterprise needs. Accordingly, data processing system 105 may include one or multiple computer programs 109 configured to operate on data in data store 104. The computer programs 109 may be of any suitable type and written in any suitable programming language(s). For example, in some embodiments, computer programs 109 may include one or more computer programs written at least in part using the structured query language (SQL) and configured to access data in one or more databases part of data store 104. As another example, in some embodiments, data processing system 105 is configured to execute programs in the form of graphs and computer programs 109 may comprise one or more computer programs developed as dataflow graphs. A dataflow graph may include components, termed "nodes" or "vertices," representing data processing operations to be performed on input data and links between the components representing flows of data. Techniques for executing computations encoded by dataflow graphs are described in U.S. Pat. No. 5,966,072, titled "Executing Computations Expressed as Graphs," which is incorporated by reference herein in its entirety.

Further, the data processing system 105 may include tools and/or utilities to perform dependency analysis functions as described herein. In the illustrated embodiment of FIG. 1A, data processing system 105 further includes development environment 108 that may be used by a person (e.g., a developer) to develop one or more of computer programs 109 for operating on data in data store 104. For example, in some embodiments, user 102 may use computing device 103 to interact with development environment to specify a computer program, such as a dataflow graph, and save the computer program as part of computer programs 109. An environment for developing computer programs as data flow graphs is described in U.S. Pat. Pub. No.: 2007/0011668, titled "Managing Parameters for Graph-Based Applications," which is incorporated by reference herein in its entirety. Dependency analysis tools may be accessed in the development environment by a developer such as user 102 or in any other way.

In some embodiments, one or more of computer programs 109 may be configured to perform any suitable operations on data in data store 104. For example, one or more of computer programs 109 may be configured to access data from one or more sources, transform the accessed data (e.g., by changing data values, filtering data records, changing data formats, sorting the data, combining data from multiple sources, splitting data into multiple portions, and/or in any other suitable way), calculate one or more new values from accessed data, and/or write the data to one or multiple destinations.

In some embodiments, one or more of computer programs 109 may be configured to perform computations on and/or generate reports from data in data store 109. The computations performed and/or reports generated may be related to one or more quantities relevant to a business. For example, a computer program may be configured to access credit history data for a person and determine a credit score for the person based on the credit history. As another example, a computer program may access telephone call logs of multiple customers of a telephone company and generate a report indicating how many of the customers use more data than allowed for in their data plans. As yet another example, a computer program may access data indicating the types of loans made by a bank and generate a report indicating the overall risk of loans made by the bank. These examples are illustrative and non-limiting, as a computer program may be configured to generate any suitable information (e.g., for any suitable business purpose) from data stored in data store 104. The programs 109 may be invoked by a user 130, for example, to gain business information from data processing operations.

In the illustrated embodiment, data processing system 105 also includes a metadata repository 110 that supports the performance of various tasks that may occur during the operation of system 105, including those related to maintaining the programs and data governance. In the illustrated embodiments, the metadata repository 110 includes data dependency module 118, control dependency module 120 and code summaries 122. Information on data dependencies, control dependencies and code summaries, respectively, may be obtained as described herein. This information may be stored in any suitable format. As a nonlimiting example, data dependency module 118 may comprise one or more tables indicating for each of multiple variables in computer programs 109 other variables in those computer programs upon which there is a dependency. Control dependency module 120 may analogously store information about variables that have values potentially impacted by execution of blocks of code in the programs 109 that are conditionally executed, depending on the value of one or more of the variables.

Code summaries module 122 may store portions of code in programs 109 in which dependencies, either data or control dependencies, are introduced. The code summaries may identify the code by storing copies of the relevant source code or pointers to portions of a source code file containing the relevant code. Code may be identified in any suitable way, such as by a copy of the source code or by a pointer to a portion of a source code file containing the relevant code.

Figure 1B:
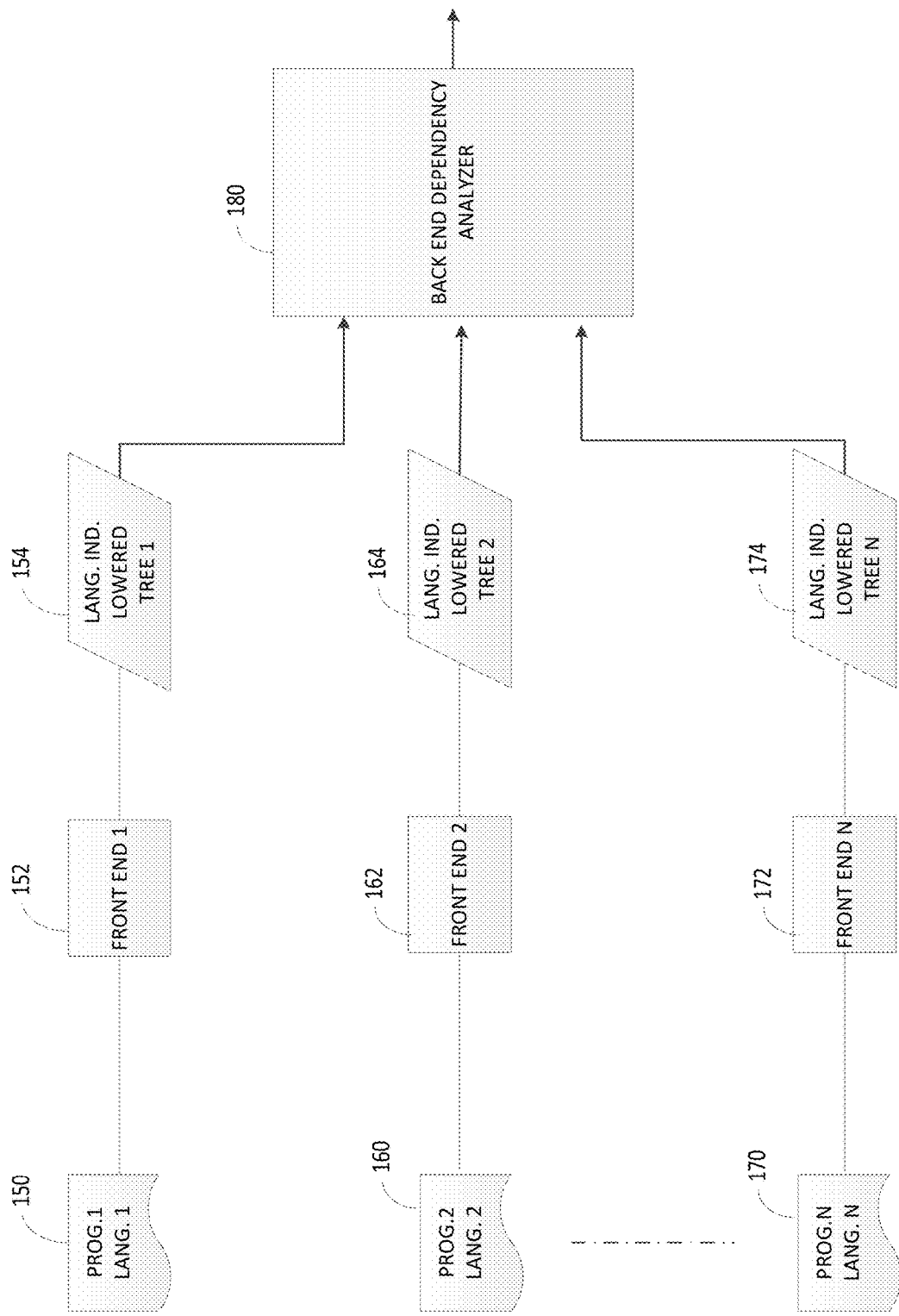
FIG. 1B is a functional block diagram of processing to compute dependency information.

FIG. 1B illustrates processing that may be performed to produce dependency information. FIG. 1B illustrates that multiple programs, illustrated as programs 150, 160, 170 in FIG. 1B, may be processed to identify dependency information. Those programs may collectively control the data processing system to process data from one or more data sources. The programs may be written in different programming languages. In the example of FIG. 1B, program 150 is shown written in language 1, program 160 may be written in language 2 and program 170 may be written in language N. However, it is not a requirement that all of the languages be different, and in some embodiments, some or all of the plurality of programs may be written in the same language. As a specific example, some of the programs may be written as stored procedures calls such as may be executed to process data in a database. Others may be written in a graphical programming language and others may be written in yet other languages.

Regardless of the combination of languages in which the programs are written, each program may be processed using language dependent processing. In FIG. 1B, the language dependent processing is performed in front end modules 152, 162 and 172, each of which is configured for processing programs in its respective language.

The output of each front end module may be a dependency data structure reflecting dependencies introduced by processing with a program. As shown in FIG. 1B, each front end may output its own dependency data structure, which may be a lowered parse tree, 154, 164 and 174. A lowered parse tree may be created, for example, by parsing the program to produce a parse tree and then lowering the parse tree to remove information unrelated to dependencies. In accordance with some embodiments, the lowered parse tree may be represented using a finite set of dependency constructs. As each of the parse trees may be lowered by representing dependency information in a language-dependent parse tree by language-independent dependency constructs, the lowered parse trees 154, 164 and 174 may be language independent.

The lowered parse trees may then be processed together, allowing dependency information to be generated for all of the programs 150, 160, 170 that may be executed by a data processing system. This processing may be performed in backend 180. Backend processing may be language independent, allowing backend 180 to be used in any data processing system, regardless of the language in which programs for that system are written.

The dependency information generated in backend 180 may be used in any desired way. In the embodiment of FIG. 1A, dependency information is stored in a data store that acts as a metadata repository 110. Metadata repository 110 may be implemented in any suitable way. An example of such a repository may be found, for example, in US Pre-Grant Publication 2010/0138431 A1, which is incorporated herein in its entirety. Such a metadata repository may hold dependency information introduced in any of the programs that collectively implement the data processing system. That dependency information may include data indicating data elements in the plurality of programs and may be structured so as to indicate dependencies between the data elements. For example, the dependency information may be structured as a series of lists, with each list associated with a target data element and comprising entries that are source data elements on which the target may depend. Such information may alternatively, or additionally, be stored as a table where each row and column corresponds to a variable, and the cells at the intersection of each row and column indicating whether there is a dependency between the row variable and column variable. In some embodiments, the information in each cell may additionally indicate information about the dependency, such as whether it is a data flow dependency or a control flow dependency or where additional information about the dependency may be accessed.

The information in metadata repository 110 may be used in any suitable way. For example, it may be used in operating or maintaining computer programs 109. As a specific example, a programmer 102 may change a portion of one of the computer programs 109 that impacts the value of a first variable. Programmer 102 may identify, based on the information in metadata repository 110, other portions of the computer programs 109 with variables that depend on that first variable. Programmer 102 may test those portions to ensure that their operation was not disrupted by the change. As another example, a user 130 of the data processing system 105, interacting with the system through computing device 134, may analyze data in a report produced by data processing system 105. User 130, for example, may question the validity of a computed value presented in the report, and may access information in metadata repository 110 to identify the sources of data used to compute the questioned value. User 130 may then investigate the quality of those data sources, thereby validating the quality of the data in the report. The information in the metadata repository may be accessed and processed automatically, by invoking a tool, for example.

Regardless of how the metadata in repository 110 is used, enabling data processing system 105 to generate that metadata, even when there are programs written in multiple different programming languages, can increase the reliability of data processing system 105, and enable data processing system 105 to perform new functions.

Figure 2:
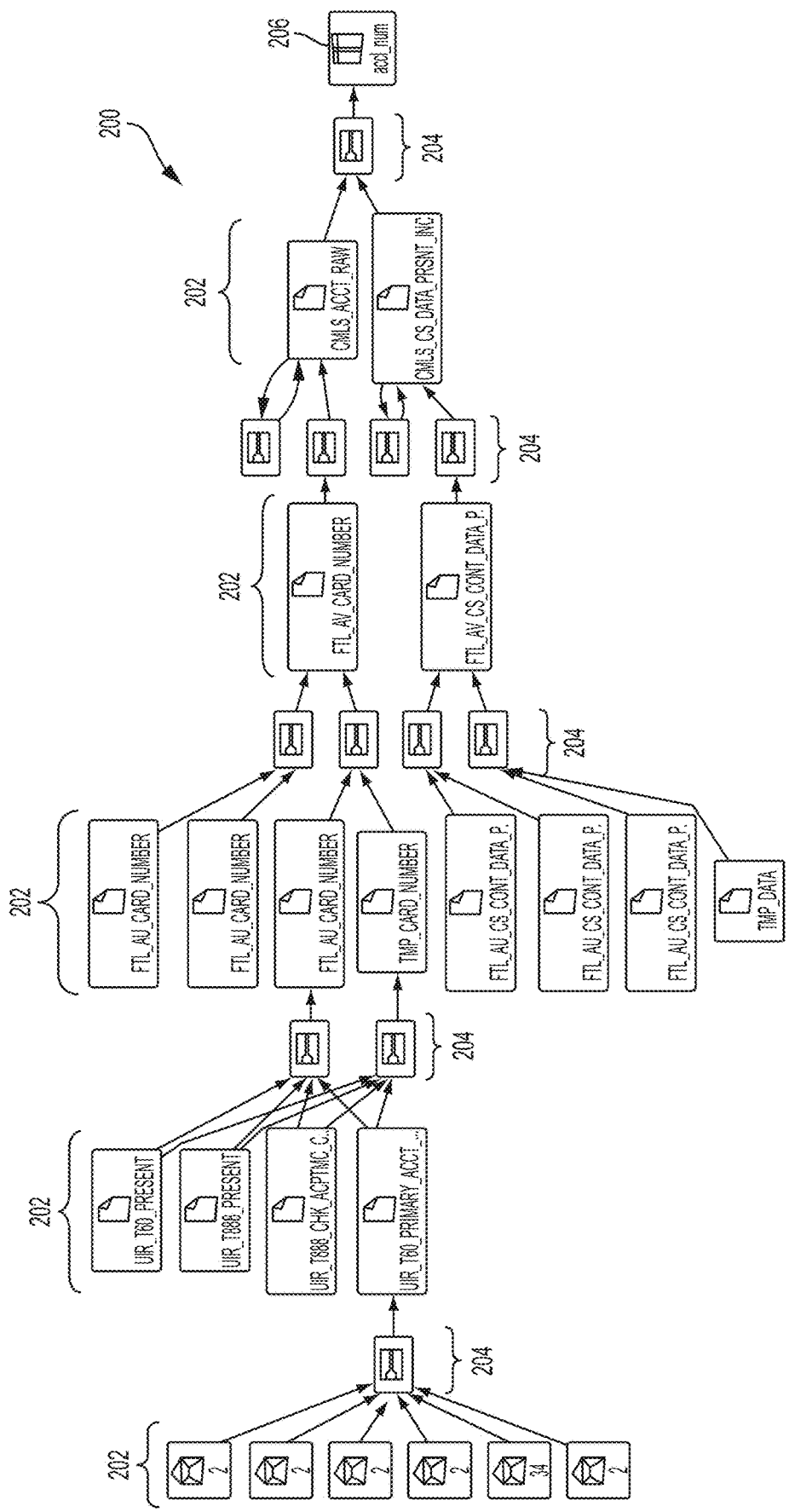
FIG. 2 is an illustrative graphical representation of an illustrative derived data lineage, in accordance with some embodiments of the technology described herein.

Those functions may be enabled, in whole or in part, by having access to data lineage. Data lineage is an indication of where, within the data processing system, data used to generate values of specific variables is obtained or processed. FIG. 2 is a data lineage diagram 200 for an illustrative programmed data processing system. The data lineage and the diagram illustrating it may be generated by identifying dependencies, as described herein. Data lineage diagram 200 includes nodes 202 representing data entities and nodes 204 representing transformations applied to the data entities.

The data entities may, for example, be data sets, such as files, databases, or data formatted in any suitable way. In some embodiments, the data entities may be "fields," which may be elements accessed from a particular data store. For example, in a data store formatted as a table, with cells organized rows and columns, a field may be a cell. As another example, in a database organized as a plurality of records, a field may be a field within a record. Regardless of the specific organization of the data stores accessed by a data processing system, the programs implementing the data processing system may read from and/or write from those fields such that those fields are referenced in programs that implement the data processing systems. Accordingly, those programs create dependencies related to those fields, with some fields having values dependent on the values of other fields. In some embodiments, a dependency analyzer as described herein may compute and store dependency information related to fields and that information may reflect dependencies introduced in any of the programs that may impact or be impacted by values in specific fields. This field-level dependency information enables a dependency analyzer to provide information about field-level lineage across programs in any one of multiple computer programming languages in which the data processing system may be programmed.

Though FIG. 2 illustrates each node 202 with the same symbol, it is not a requirement that all of the nodes be of the same type. To the contrary, in a modern enterprise, the nodes 202 may be of different types, such as may result from an enterprise using components from ORACLE, SAP or HADOOP. Components from ORACLE or SAP may implement a database as is known in the art. Components from HADOOP may implement a distributed file system. A common database that sits on the HADOOP Distributed File System is known as HIVE. Such components may be used to implement a database or may be used to implement a dataset stored in the distributed file system. Accordingly, it should be appreciated that techniques as described herein may work with programs in many languages performing operations on datasets in any of a number of formats.

Moreover, each node need not correspond to a single hardware component. Rather, some data sources, which may be represented as a single node in FIG. 2, may be implemented with distributed database technology. HADOOP is an example of distributed database technology in which one data source might be implemented on multiple computer hardware devices.

Figure 4:
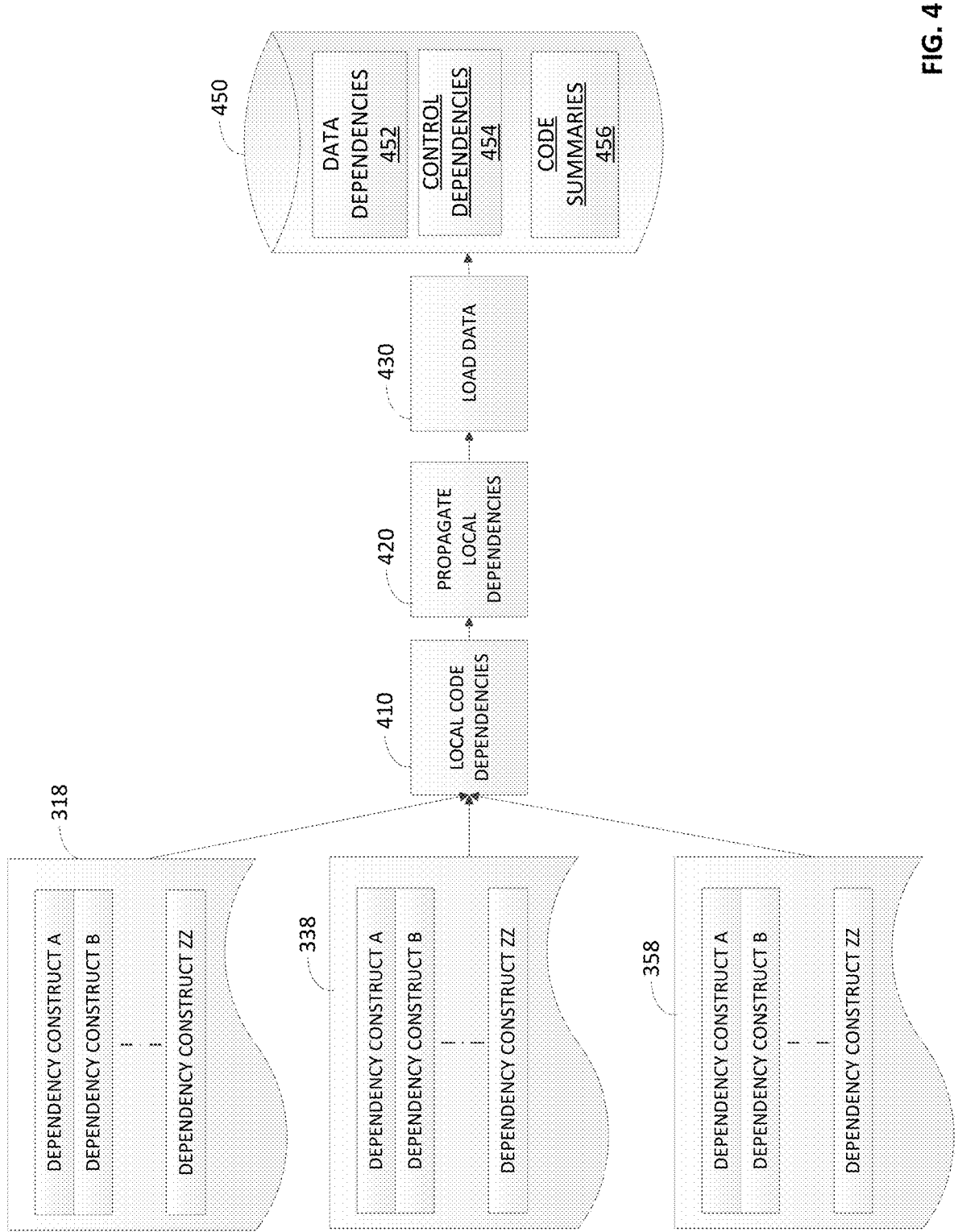
FIG. 4 is a functional block diagram of language independent, backend processing to produce a dependency metadata structure.

The transformations represented by nodes 204 may be implemented by computer programs. Though all of the nodes 204 in FIG. 4 are shown with the same symbol, it is not a requirement that all of the programs be written in the same programming language. To the contrary, the language used may depend on the type of node 202 from which the node 204 obtains data or may vary from node to node for any of a number of reasons in an enterprise environment. Techniques as described herein may be applied in such heterogeneous environments.

The data lineage diagram 200 illustrates upstream lineage information for one or more data elements in data entity 206. Arrows coming into a node representing a transformation indicate which data entities are provided as inputs to the transformation. Arrows coming out of nodes representing transformations of data indicate data entities into which results of the transformations are provided. Examples of transformations include, but are not limited to, performing calculations of any suitable type, sorting the data, filtering the data to remove one or more portions of data (e.g., filtering data records to remove one or more data records) based on any suitable criteria, merging data (e.g., using a join operation or in any other suitable way), performing any suitable database operation or command, and/or any suitable combination of the foregoing transformations. A transformation may be implemented using one or more computer programs of any suitable type including, by way of example and not limitation, one or more computer programs implemented as dataflow graphs.

A data lineage diagram, such as diagram 200 shown in FIG. 2, may be useful for a number of reasons. For example, illustrating relationships between data entities and transformations may help a user to determine how a particular data element was obtained (e.g., how a particular value in a report was compute). As another example, a data lineage diagram may be used to determine which transformations were applied to various data elements and/or data entities.

In some embodiments, a data lineage may represent relationships among data elements, data entities containing those data elements, and/or transformations applied to the data elements. The relationships among data elements, data entities, and transformations, may be used to determine relationships among other things such as, for example, systems (e.g., one or more computing devices, databases, data warehouses, etc.) and/or applications (e.g., one or more computer programs that access data managed by a data processing system). For example, when a data element part of a table in a database stored in system "A" located in one physical location is indicated, within a data lineage, to be derived from another data element part of another table in another database stored in system "B," then a relationship between systems A and B may be inferred. As another example, when an application program reads one or more data elements from a system, a relationship between the application program and the system may be inferred. As yet another example, when one application program accesses data elements operated on by another application program, a relationship between the application programs may be inferred. Any one or more of these relationships may be shown as part of a data lineage diagram.

It should be appreciated that FIG. 2 shows data lineage in a way in which each target data element is shown with the source data elements linked to which it depends directly related to it. Those source data elements may, in turn, depend on other data elements. The representation of data lineage as shown in FIG. 2 enables these indirect dependencies to be identified, as the source data elements for each data element that is a source for a target data element may be identified by tracing dependencies back through the data lineage as shown in FIG. 2. In embodiments described herein, data lineage may be stored in such a way as to enable this tracing back to identify indirect dependencies. However, it should be appreciated that dependency information may be stored in any suitable way, which may include, in some embodiments, identifying and storing the indirect dependencies.

It should also be appreciated that a data processing system may manage a large number of data elements (e.g., millions, billions or trillions of data elements). For example, a data processing system managing data associated with credit card transactions may process billions of credit card transactions a year and each of the transactions may include multiple data elements such as, for example, credit card number, date, merchant id, and purchase amount. Accordingly, data lineage may represent relationships among a large number of data elements, data entities containing those data elements, and/or transformations applied to the data elements. Because a data lineage may include a large amount of information, it is important to present that information in a manner that is digestible by the viewer. Accordingly, in some embodiments, information in a data lineage may be visualized at different levels of granularity. Various techniques for visualizing information in derived lineages and some aspects of techniques for generating and/or visualizing data lineages are described in: (1) U.S. patent application Ser. No. 12/629,466, titled "Visualizing Relationships Between Data Elements and Graphical Representations of Data Element Attributes," filed on Dec. 2, 2009; (2) U.S. patent application Ser. No. 15/040,162, titled "Filtering Data Lineage Diagrams," filed on Feb. 10, 2016; (3) U.S. patent application Ser. No. 14/805,616, titled "Data Lineage Summarization," filed on Jul. 22, 2015; (4) U.S. patent application Ser. No. 14/803,374, titled "Managing Parameter Sets," filed on Jul. 20, 2015; and (5) U.S. patent application Ser. No. 14/803,396, titled "Managing Lineage Information," filed on Jul. 20, 2015, each of which is incorporated by reference in its entirety.

Regardless of how this information is used, it may be derived according to a process as described herein by tools that implement frontend, programming language dependent processing and backend, programming language independent processing. This approach reduces both programming and processing demands of the system. Backend processing, for example, may be shared across programs implemented in many different programming languages, reducing the amount of memory and other computing resources required to implement the system. Front-end processing, though language specific, may leverage existing parser techniques developed for a compiler, interpreter or other existing tools.

Figure 3A:
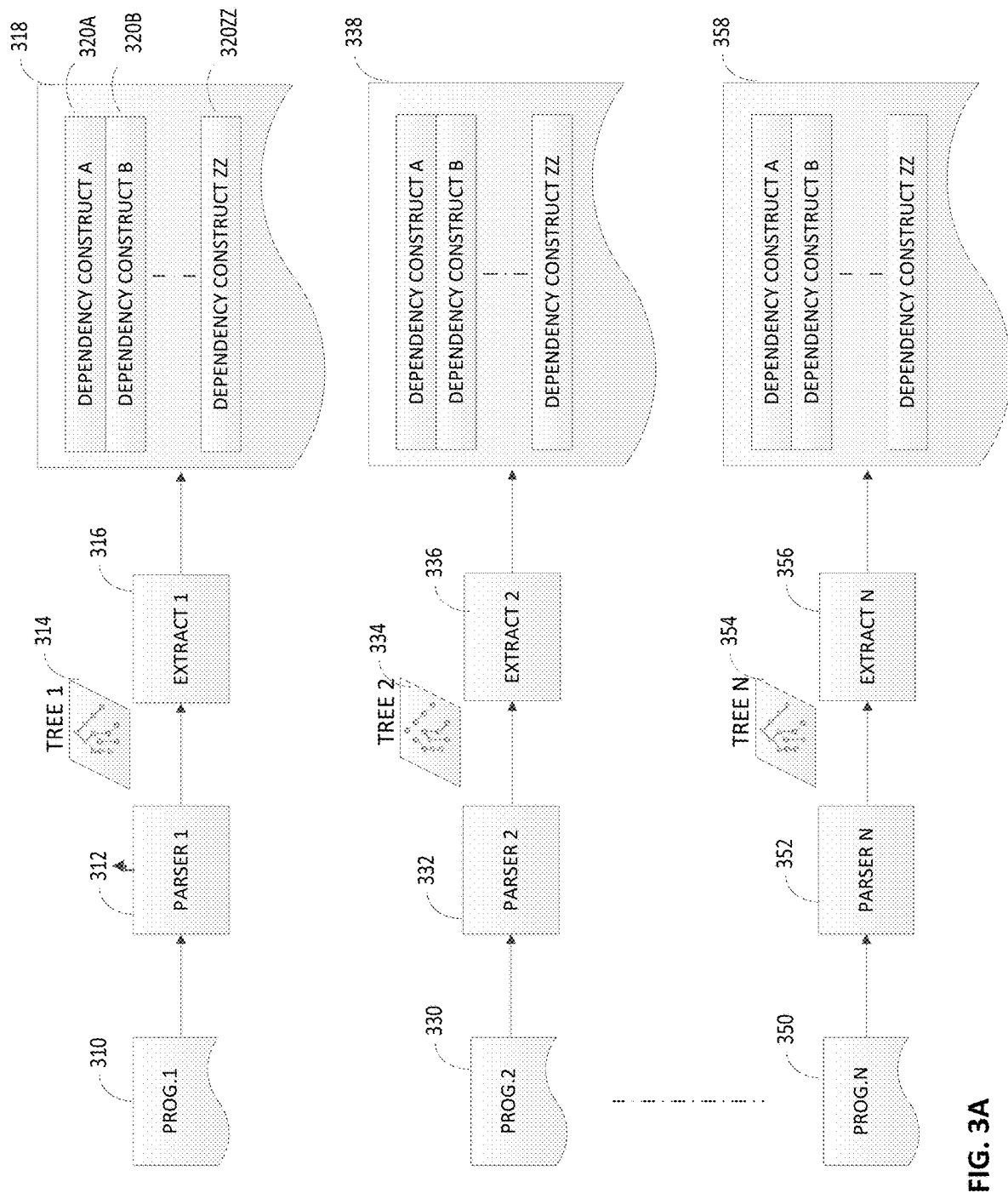
FIG. 3A is a functional block diagram of language dependent, frontend processing to produce a dependency metadata structure.

FIG. 3A is a functional block diagram of front end processing. The front-end processing illustrated in FIG. 3A converts source code, in any of multiple programming languages, into a data structure in which dependencies are represented in a language independent way. FIG. 3A illustrates processing on a program 310. Program 310 may be one of the computer programs 109 (FIG. 1A), and may be written in any suitable programming language.

Program 310 is provided as an input to parser 312. Parser 312 may be a parser of known construction configured to process program code in the language in which program 310 is written. The output of parser 312 may be a parse tree 314. Parse tree 314 may be in a known format, and may represent the operations specified by the program code within program 310. Parse tree 314 may be stored in computer memory as a first data structure representing program 310. However, it should be appreciated that the operations performed in accordance with program 310 may be represented in any suitable way.

Parse tree 314 may then be processed by extraction module 316. Extraction module 316 may, like parser 312, be specific for the programming language in which program 310 is written. Extraction module 316, when executed, may traverse the data structure representing parse tree 314 to identify elements indicating operations in the program 310 that may create either a data flow or control flow dependency. Upon detecting such an operation, extraction module 316 may make an entry in a second data structure, here represented as dependency data set 318.

Extraction module 316 may be implemented by applying the inventors' insight that the collection of operations in a program that might introduce dependencies may generally be represented, for purposes of identifying data and control flow dependencies, by a small number of constructs. Moreover, the number of operations supported by a programming language that might introduce dependencies is also finite and relatively small. Accordingly, extraction module 316 may be configured to traverse parse tree 314 using known techniques to identify each dependency-affecting operation in program 310 and to enter information representing the dependencies in the second data structure.

Once such a dependency-affecting operation is identified, extraction module 316 might then select one or more dependency constructs that represent the identified operations. Such a selection might be made using a table lookup, heuristics or other suitable techniques. Extraction module 316 might then parameterize the dependency construct using the parameters of the operation identified in parse tree 314.

As a specific example, if extraction module 316 identifies an "add" operation in parse tree 314, that operation may be mapped to a dependency construct. In this example, the "add" operation involves three variables, "a", "b", and "c", of which "a" is the output of the operation and has a value that depends on the values of "b" and "c." Those three variables might be used by extraction module 316 in parameterizing the dependency construct. In accordance with one exemplary embodiment, that dependency construct might be called an "assignment." The dependency construct might, in this example, indicate that the target variable "a" is assigned a value that depends on source variables "a" and "b."

It should be appreciated that, in some embodiments, whether a dependency among variables exists as a result of executing a program may depend on values assigned to the variables of the programs while it is executing. However, for simplicity, extraction module 316 may be configured to classify as a dependency-affecting operation any operation in which the result might depend on values of one or more other variables. Likewise, in some instances, portions of a program may not execute in some scenarios based on values of one or more variables. Nonetheless, extraction module 316 may be configured to process all operations in parse tree 314 that could, under any circumstance execute or effect the value of a variable, and record those operations in dependency data set 318.

FIG. 3A illustrates that dependency data set 318 includes multiple dependency constructs 320A, 320B . . . 320ZZ. Each dependency construct may be in the form of one of the finite number of dependency constructs that characterize program 310.

The following provides examples of those constructs. In some embodiments, an extraction module may be programmed to recognize a subset of these constructs. In other embodiments, the following examples represent the finite set of constructs that the extraction module recognizes. In other embodiments, dependencies may be expressed in other ways.

Example 1, "Function"

In accordance with some embodiments, a portion of code that represents a function may appear as follows:

```
f( ) {
}
```

This code, after being translated to a parse tree and processed, might be expressed as follows:

```
3:1 4:1   f1( ){
}
```

Example 1 illustrates a simple function being expressed as a procedure definition. From a dependency point of view, a procedure has scopes, input, output, or bidirectional parameters. A function is a procedure with a return parameter.

"3:1 4:1" is the start and end location in the source file for the generated construct. This information may serve as a pointer to code that generated the dependency, which may be used to generate code summaries that may be stored in the metadata repository 110. Alternatively or additionally, an extraction module may capture information about the source code that gave rise to a dependency by copying lines of code. In accordance with some embodiments, an extraction module may be programmed to indicate, whether by a pointer, a copy of source code or in some other way, only a summary of the code in which a dependency is created. The code may be summarized in any suitable way, such as by selecting a line of code in which an assignment is made, plus one or a finite number of lines before and/or after that line containing the assignment. Other rules may be coded into the extraction module to reduce the amount of storage space needed for code summaries. For example, only the operators in a line of code may be copied or only lines that expressly reference a target variable within a block of code may be copied.

Example 2: Assignment

As a second example, the following dependency affecting operation might appear in source code.

```
f( x in, y out) {
    y = x;
}
```

Through frontend processing, that operation might be expressed as a dependency construct as follows:

```
21:1 23:1   f2( x, y OUT) {
22:5 22:11      y [ x ]
}
```

In this, and the other examples, square brackets are used for dependency lists and parentheses are used for parameter and argument lists. Curly brackets are used for scope. For example, "y [x]," indicates a single dependency, with "y" being dependent on "x". In the language constituting the set of dependency constructs provided as an example herein, a dependency always has a single target element, "y" in this case, and a source element list. In this example, the source element list is "[x]," and consists of one element, "x." Pointers to source code for the purpose of generating source code summaries at later phases of processing are also illustrated in this example. Here, a relevant portion of sour code is illustrated as "21:1 23:1" and "22:5 22:11," which may be pointers to lines in source code files where source code statements creating the corresponding dependencies may be found.

This example also illustrates data elements: "x" and "y." These elements represent the basic/lowest level/atomic field. In this example, "x" appears in the source list of elements and "y" is the (sole) target element.

Knowledge of directionality of parameters/arguments may be used in dependency analysis. Accordingly, dependency constructs may also represent directionality. Three types exist: IN, OUT, INOUT. In the language of the example, if no directionality is stated, IN is implied.

It should be appreciated that this syntax makes the dependency constructs human readable. It is not a requirement of the invention that the dependency constructs be human readable, as processing described herein may be automated. Accordingly, any information that represents the dependency constructs may be stored in computer memory and used to identify dependency constructs.

Example 3: Return

A function that returns a value for a variable may also create a dependency, because the value of the returned variable may depend on processing within the function, including variables used in the processing of that function. A function

```
f(x) {
    return x
}
``` might be expressed by a dependency construct as follows:

```
f3( x ) {
    _RETURN [ x ]
}
```

"_RETURN" is a special data element name used to designate the unnamed entity that is returned by the function. This example illustrates that data elements, other than expressly declared variables, may have or create dependencies. In the processing described herein, data elements, regardless of how created, may be processed. "_RETURN" is an example of a local data element—it has meaning only within the program. However, even a local data element may be used in an assignment to a "global variable," may control execution of portions of the program, or may be used in some other way that creates a data flow or control flow dependency. If the value of "_RETURN" depends on other data elements, those dependencies may in turn impact a "global variable" or otherwise create a dependency that is to be recorded. Accordingly, while "_RETURN" need not be included in the ultimate metadata store that is created, in embodiments described herein, it may be considered in identifying dependencies.

In this example, the function returns only a single value. If functions return multiple values, the "_RETURN" construct might be changed to accommodate more than one value. Further, it should be appreciated that, as with the syntax used to represent the other dependency constructs, "_RETURN" serves as a symbol, which is here formatted for human readability. When implemented in a data processing system, any suitable symbol or symbols may be used.

Example 4: Constant Assignment

Dependencies in code, including a constant assignment, such as as follows:

```
f( ) {
    int u;
    int v;
    u = 2;
    v = 4;
    return u+v;
}
``` might be expressed as:

```
f4( ) {
    _declare ( u, v)
    u [ _CONST ]
    v [ _CONST ]
    _RETURN [ u, v ]
}
```

In this example, "_declare" and "_CONST" are symbols for other special elements, like the "_RETURN" symbol. It should be noted that, in the dependency constructs, information about the value of the constant variables "u" and "v" is not included. For purposes of analyzing dependencies, such information is not necessary and may be omitted.

In some embodiments, the construct "_CONST" may be omitted, but, in some embodiments, it may be included to make it easier for humans to understand a collection of dependency constructs representing one or more programs and may simplify computer processing of a data structure containing those constructs.

Example 5: Call Site

Dependencies in code, including a call to a function, defined as follows:

```
g( x IN, y IN, z OUT) {
    z = x+y;
}
f( ) {
    u = 2;
    v = 4;
    g( u, v, w);
    return w;
}
``` might be represented by a dependency construct as follows:

```
g1( x, y, z OUT) {
    z [ x, y ]
}
f5( ){
```

```
    _declare ( u, v, w)
    u [ _CONST ]
    v [ _CONST ]
    g1 ( u, v, w)
    _RETURN [ w ]
}
```

This example includes a procedure or function call site. Arguments are supplied to the procedure at the call site. The data entities that act as arguments may impact the value of other data elements such that processing within the called procedure may be dependent on those arguments.

In this example, the data entities "u" and "v," are assigned constant values. Accordingly, the processing within the procedure based on those arguments will yield a constant result, which might be captured in the dependency construct without indicating a dependency on "u" and "v." In some embodiments, dependency information may be generated in a two-phase process, with the first phase involving language-dependent processing and the second phase involving language-independent processing.

In some example embodiments described herein, dependencies on local variables may be identified and removed in the second phase of the processing, resulting in the final dependency information being expressed in terms of external variables rather than local variables that have a scope only internal to a function or other block of code internal to a program. Accordingly, in this example, in first phase processing, dependence of the variable "w," and therefore the value returned by the function "f5( )," may be expressed as dependent on "u" and "v." In second stage processing, "u" and "v," and the value returned by the function "f5( )" may be indicated to depend on constant values.

This process of propagating local dependencies may be continued throughout the program being processed. When function "f5( )" is called in the program, its returned value may be assigned to another variable. In the first stage of processing, that variable may be indicated to depend on the value returned by function "f5( )". In the second phase of processing, that dependency on a local variable representing the value returned by function "f5( )" may be replaced with an indication of the global variables on which the value returned by function "f5( )" depends. In this example, the value returned by function "f5( )" may depend on constant values. In cases in which the value returned by function "f5( )" depends on external variables, the dependency, instead of being based on constant values, may be recorded as depending on those external variables.

Example 6: Call Site with Constant Arguments

Dependencies in code, including a call to a function, defined as follows:

```
    add( x IN, y IN) {
        return x + y;
    }
    f( ) {
        return add( 2, 4);
    }
``` might be represented by a dependency construct as follows:

```
    add1( x, y) {
        _RETURN [ x, y ]
    }
    f6( ){
        _RETURN [ add1( _CONST, _CONST) ]
    }
```

Arguments given a constant value may be treated like data elements assigned a constant value.

Example 7: Read or Write to a Global Table

Operations on data entities, other than elemental data elements, may also be handled by a system as described herein. In some embodiments, data entities may be hierarchical. An operation may be performed on a data entity at any level of the hierarchy. Accordingly, dependency constructs may accommodate identification of data entities at any applicable level of the hierarchy. One such data entity might be, for example, a global table, which is an example of a data set. A data set may include other data entities within it. A table, for example, includes rows and column, which might be considered to be data entities.

Operations might be performed that impact or rely on the table itself, potentially impacting any of the data entities within the table. The table also has rows, columns, or other subdivisions, creating a lower level in the hierarchy. Operations might impact or rely on just data elements within a subdivision, such as a row or column. Though, operations that depend on any subset of a data set are possible, such as operations on a single data element in a row or column of the table.

To specify a data entity in such a hierarchy, a tuple notation may be used. The entity at the highest level of the hierarchy may be designated first, followed by a designation of the entity at the next highest level in the hierarchy. As a specific example, the tuples may be designated with a "dot" notation, with a "." separating each symbol forming the tuple. In the example that follows, the first value of the tuple, here "T1," identifies a table. The second value of the tuple, here "C1," identifies a column in that table. The second value might alternatively identify a row. In some embodiments, the tuple may include values identifying both a row and a column, specifying a data element at an even lower level of the hierarchy.

Dependencies for an operation on such a table, as follows:

```
    f( ) {
        INSERT into T1.C2 SELECT from T1.C1
    }
``` might be expressed by a dependency construct as follows:

```
    7( ){
        _declare ( T1.C1, T1.C2 )
        T1.C2 [ T1.C1 ]
    }
```

Example 8: Expression with Multiple Elements Used as an Argument at a Call Site

Dependencies created by calling a function, defined as follows:

```
add( x , y ) {
    return x + y;
}
f(u, v, w OUT) {
    w = add( u + v, 6);
}
``` might be expressed by a dependency construct as follows:

```
add2( x, y) {
    _RETURN [ x, y ]
}
f8( ){
    _declare( u, v, w)
    w [ add2( [ u, v] , _CONST) ]
}
```

This example illustrates a differentiation between dependency source lists, which are enclosed in square brackets, "[ ]", and arguments, which are enclosed in parentheses, "( )".

Example 9: Conditional Statements Creating a Control Flow Dependency

This example illustrates how a programming statement that creates conditional control flow may be represented for dependency analysis. In this example, the conditional statement is in the "if then . . . else" format. This example relates to a function including such a conditional statement as follows:

```
f(x in, y out) {
    if( x == 0) {
        y = 0;
    } else {
        y = 1;
    }
}
```

Such an "if then . . . else" statement is supported in many programming languages. There may be variations from language to language as to how this statement, or any statement, is expressed in a program. As the processing of extraction module 316 may be specific to one programming language, any variations in how an "if then . . . else" statement is expressed from language to language may be accounted for by configuring the extraction module to identify the construct in the specific language for which that module will be used. Such a statement may be expressed by a dependency construct as follows:

```
173:1 179:1    f9( x, y OUT) {
174:5 178:5        _condition [ x, _const ]
               {
                   y [ _const ]
                   y [ _const ]
               }
           }
```

In this example, the contents of the "then" and "else" branches from the "If" statement are merged into a single block for the purpose of expressing dependency constructs. Though, in execution of the program, one or the other of the branches will be taken, the decision as to which branch will be taken depends on the same data entities, allowing the dependency of both the "then" and "else" blocks to be expressed in the same way. In this example, the value of the variable "x" dictates which branch is taken, so both depend, for control flow, on the variable "x". The control flow dependency of that block may be expressed as "_condition [x]," as shown above.

Code that shares the same control flow dependencies may be processed as one block. Such processing is appropriate because dependency analysis, in accordance with some embodiments described herein, is based on a static code analysis, and identifies dependencies that could arise in execution of the code.

In this example, each branch, if executed, assigns a value to a variable "y" based on a constant. Thus, considering both branches together still leads to the conclusion that, within that block of code, y will be assigned a value that depends on a constant. Accordingly the value returned by the function will depend on a constant, but the specific constant will depend on the value of x. Such a dependency of control and data flow may be expressed as "_condition[x, _CONST]."

One of skill in the art will recognize that, for programming constructs that create three or more possible control flows, there will be three or more blocks of code that are conditionally executed. It is possible that execution for each of those blocks of code may depend on different variables. In that case, the programming construct may be represented by different dependency constructs for each of the blocks or for subsets of the blocks.

Example 10: Control Flow Dependency Created by a "while Do" Loop

A control flow dependency might also be created by a statement that implements a "while do" loop. With such a loop, a block of code will be executed while a stated expression evaluates to true. In this scenario, there is a control flow dependency between that block and any data entity that influences the value of that expression. An example of a function with such a statement is:

```
f(x,y OUT) {
    int y = 0;
    int i = 0;
    while( i <= x) {
        y = y + i;
        i = i + 1;
    }
}
```

Dependencies in that function may be expressed as follows:

```
f10( x, y OUT) {
    _declare i
    y [ _CONST ]
    i [ _CONST ]
    _condition [ i, x ]
    {
        y [ y, i ]
        i [ i, _CONST ]
    }
}
```

In this example, the block of code inside the "while do" loop might get executed at least once. Accordingly, dependencies created by statements inside that block will be represented in the extracted dependency information. Additional dependencies may be created by variables that may change inside that loop, such that their value will depend on the number of times that loop is executed. In that scenario, any such variables will have a dependency on any data entity whose value may impact the number of times the loop is executed.

In this example, the loop will be executed a number of times that depends on the values of "i" and "x." For this reason, a condition is stated: "_condition [i, x]," representing that the values of "i" and "x" can impact the control flow. The indications that "y [y, i]" and "i [i, _CONST]" in the brackets below the condition reflect that each of the variables "y" and "i" that could be changed in that loop will have a value that depends on the number of times that loop is executed.

Dependencies created by other conditional statements, such as "for", "while do", "do until", "switch" or "case," may similarly be represented by this condition-block construct. As specific examples, "for" and "while do" get a condition and a block; "do until" copies the contents of the blocks and puts it above the condition/block because the code in the block is guaranteed to run at least once.

Example: 11 Level Call Tree

This example illustrates that dependencies may be represented by a limited number of constructs, even when functions call other functions. In this example, three functions are defined, with a second function, "g( )" calling a first function "h( )." A third function, "f( )" in turn calls the second function, as follows:

```
h( x, y OUT) {
    y = x * x;
}
g( s, t OUT) {
    h( s, t);
}
f( a, b OUT) {
    g( a, b);
}
```

This multi-level call tree may be expressed with each function that calls another function being represented in such a way that the call to the other function is captured for subsequent processing:

```
foo( x, y OUT) {
    y [x]
}
bar( s, t OUT) {
    foo( s, t)
}
baz( a, b OUT) {
    bar( a, b)
}
```

As can be seen by this example, no additional construct need be introduced to represent in the extracted dependency information a multi-level call tree in a program. Rather, the dependencies of the first function are captured by constructs as described above, here "y [x]." The other functions are recorded in the extracted dependency information in a way to indicate that they depend on other functions. Any dependencies that may be introduced by one function calling another function may be resolved in back-end (second phase) processing where the local dependencies are propagated.

Example 11: Recursion

As with a multilevel call tree, no additional constructs are required to represent recursion in a program in the extracted dependency information. Rather, information indicating that recursion may be stored as part of the lowered parse tree and backend processing may compute any additional dependencies that might result from that recursion.

Accordingly, a function recursively calling itself, such as:

```
f( x, y OUT) {
    int accumulator = 0;
    if( x == 0) return accumulator;
    else      accumulator = accumulator +f ( x-1, y);
}
``` may be expressed in the extracted dependency information by dependency constructs as follows:

```
f11( x, y OUT) {
    _declare accumulator
    accumulator [ _CONST ]
    _condition [ x ]{
        y [ accumulator ]
        accumulator [ accumulator, f11( x, y) ]
    }
}
```

Here, the variable "accumulator" is shown to have dependency on a constant value, as this variable is initially set to a constant value of "0" and that value might not ever be changed. Additionally, a conditional flow is indicated, depending on the value of the variable "x." Such a condition results from the "if . . . else" construct in the statement "if(x=0)." Within the block associated with that condition, the variable "y" may be given a value based on the value of "accumulator" and the value of "accumulator" may in turn depend on function "F11( )."

This information, even if not sufficient to specify the value of these variables, is adequate to allow dependencies to be identified in backend processing.

Returning to FIG. 3A, frontend processing may be performed for each program. In this example, programs 310, 320 and 350 are illustrated, but any number of programs may be present in a data processing system. The result of such processing is the dependency data sets 318, 338 or 358, respectively, for each of the programs. Each dependency data set has dependency constructs, such as dependency constructs 320A, 320B and 320ZZ, described above for dependency data set 318. As a result, the dependency data set includes information about selected operations reflected in the parse tree, specifically, operations that impact dependency. Those selected operations may be reflected by a set of dependency constructs, which may be the same, regardless of the source language in which the program processed to generate the dependency data set was written.

The specific processing to arrive at those dependency constructs may vary for each programming language. Accordingly, parser 332 may be configured, using techniques known in the art, to generate a parse tree 334 appropriate for the language in which program 330 is written. Likewise, parser 352 may be configured to generate a parse tree 354 appropriate for the language in which program 350 is written.

Each of the extraction modules, such as 336 and 356 may also be configured based on a specific programming language. Each will output as a dependency data set dependency constructs as described above. However, the input to each may be in a different format depending on the manner in which executable statements that might produce dependencies are represented in the associated programming language.

Figure 3C:
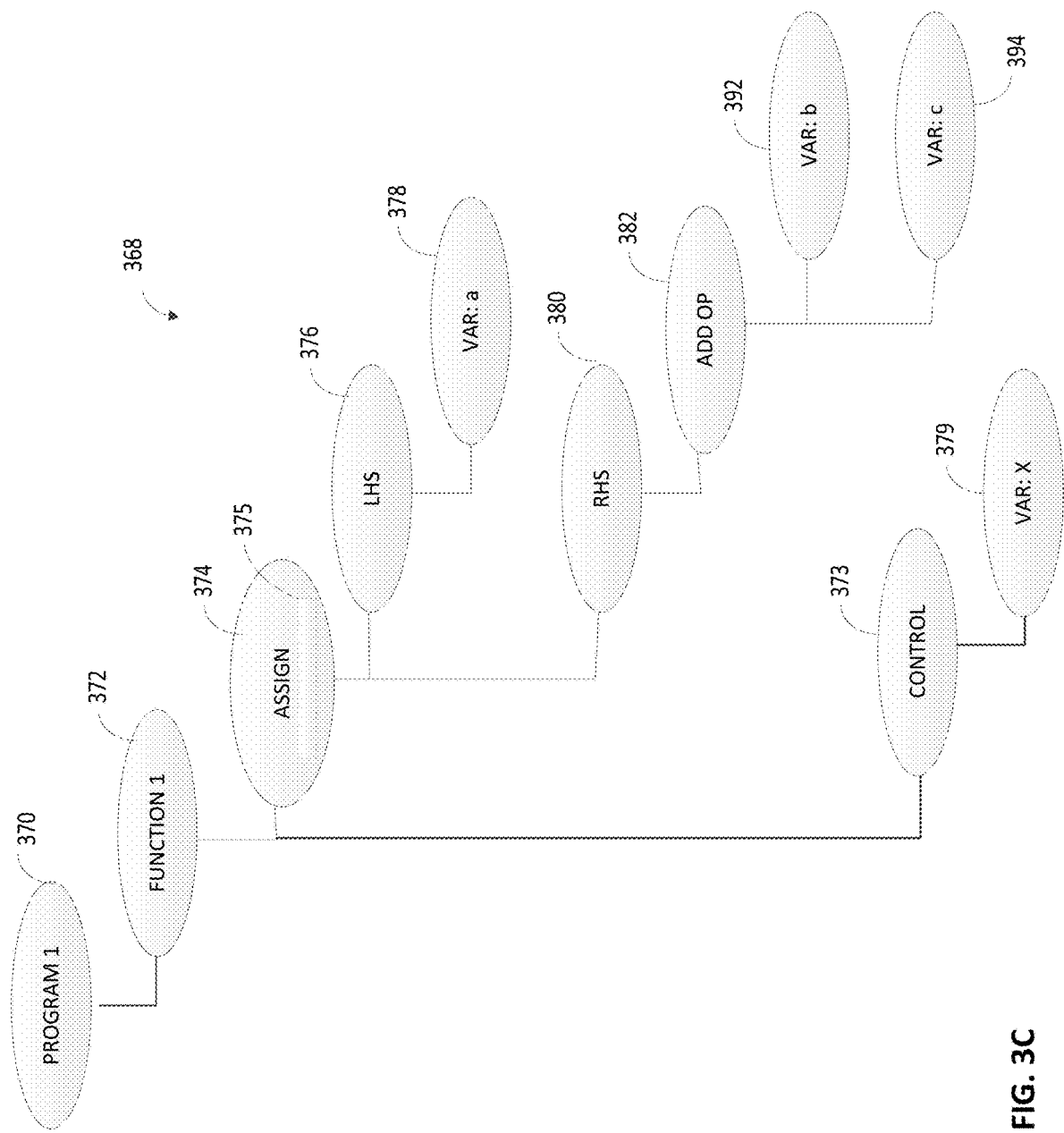
FIG. 3C is a conceptual sketch of a representation of the portion of the program of FIG. 3B as a parse tree.

FIGS. 3B, 3C and 3D provide a pictorial example of such front end processing. In this example a code segment 360 (FIG. 3B) appears in a program being processed. In this example, code segment 360 includes an assignment statement is "a=b+c." That statement is in a conditional block, defined by the conditional statement, "If(x=1){ ... }." This conditional statement is in the "If then . . . else" format, with the "else" null. That statement is defined within a function that is part of a program. That function definition may define the scope of variables that are used only within that function.

Code segment 360 may be represented in a portion of a parse tree 368 (FIG. 3C), with other segments of the code being processed, in a similar way, to represent the rest of the program in other portions of the parse tree (not shown). In this example, node 370 and the nodes that are below node 370 are within the scope of a program, indicated as PROGRAM 1.

Node 372 indicates that within PROGRAM 1 a function, FUNCTION 1 is defined. Node 372 and the nodes that are below node 372 are within the scope of a function, indicated as FUNCTION 1. In this example, nodes 373 and 374 are directly below node 372, with other nodes below those nodes.

In this example, node 374 indicates a data flow dependency. Node 373 indicates a control flow dependency. Node 374 represents one or more statements within the program being parsed that implements an assignment. In this example, a code summary 375 of those statements may be recorded in connection with node 374. As illustrated above in the examples, this code summary may be one or more pointers to lines in a source code file. Alternatively or additionally, the source code summary 375 may include copies of lines or portions of lines of code. The lines of code reflected in the summary may be selected automatically by execution of rules, heuristics or executable representation of selection logic that identifies a code statement that creates a dependency and, in some embodiments, additional statements in the program that provide context that statement. The statements to provide context, for example, may be a fixed number of statements preceding and/or following the statement that creates the dependency. Additional or different statements may be selected based on the nature of the statement that creates that dependency. For example, if the statement includes a source variable, the summary may include a statement defining that variable or the most recent statement assigning a value to that variable, even if these statements do not appear in the program near the statement creating the dependency being summarized.

Node 376 represents the left hand side of the assignment represented in node 374. This example illustrates that the variable to which a value is being assigned, a target variable, involves only one variable, variable "a" represented by node 378 in this example.

Node 380 represents the right hand side of the statement that generates the value assigned to variable "a." The right hand side includes an operation, addition in this case, as indicated by node 382. The addition operation has two inputs, which are variables "b" and "c", as indicated by nodes 392 and 394 respectively.

Node 373 represents the control flow dependency of FUNCTION 1. A control dependency associated with FUNCTION 1 indicates that any value that depends on an operation within the scope of FUNCTION 1 also has a control flow dependency because, depending on control flow, the statements within FUNCTION 1 that create a dependency might—or might not—execute in any particular case. As illustrated by node 379, that control flow dependency is based on the value of variable "X". In this example, depending on the value of X, the assignment to variable "a" represented by node 374 might—or might not—happen. This control flow dependency captures the conditional execution associated with the "If then . . . else" statement in FIG. 3B.

The portion of the parse tree illustrated in FIG. 3C may then be converted to a dependency construct 396 (FIG. 3D), which may be included in the dependency data set. Here, the dependency construct indicates that variable "a" is a target and its value depends on source variables "b" and "c." The nomenclature in this example is different than that for Example 1, above, also representing an assignment. It should be appreciated, however, that the examples above and FIG. 3B both illustrate a dependency construct in human readable form, and other forms may be used. Both illustrate the same dependency construct, which may be encoded for a computer in any way that the computer is programmed to recognize and process. As a specific example, the dependency information may be represented as a list for each target variable. Each list may include all of the source variables on which the target depends.

The portion of the parse represented by dependency construct 396 falls within the scope of FUNCTION 1. That scope may be associated with the dependency information, as illustrated in FIG. 3D by the scope identifier "Function 1." Such scope information is formatted for human understanding. It should be appreciated that, for processing by a computer, scope information may be represented in other ways, such as by associating each list of source variables for a target with a scope.

The control flow dependency represented in FIG. 3C may also be reflected in the dependencies for the target variable "a." That control flow dependency is indicated in FIG. 3D by the source variable "X" with a symbol, "*" in this example, to indicate the dependency is a control flow dependency. As with the other examples, that notation is intended to be human readable. A control flow dependency may be captured in any suitable way for computer processing, which may include associating a symbol, such as the "*," with a source variable in a list. Alternatively or additionally, the control flow dependencies may be indicated by storing source variables giving rise to control flow dependencies separately or segregating them in any other suitable way from source variables for data flow dependencies. Such data storage techniques may be used in embodiments in which processing is differentiated based for control flow versus data flow dependencies. In embodiments in which processing is not differentiated based on the nature of the dependency, source variables for control flow dependencies may be stored and processed in the same way as data flow dependencies. Alternatively, if no processing is performed based on control flow dependencies, control flow dependencies may be omitted.

FIG. 3C illustrates dependency information encoded in a second data structure for only a portion of one program. Similar processing may be performed on the entire program. If multiple programs are executed in a data processing system, as shown in FIG. 3A, similar processing may be performed for each program. In the examples provided herein, the programs are illustrated as being processed independently. However, it should be appreciated that programs may call functions defined in other programs. In that case, the dependency information may represent that a variable in one program depends on a variable from another program by indicating a scope in association with the variables.

The processing leading to a representation of dependencies as illustrated in FIG. 3D may indicate dependencies for local variables and dependencies on local variables. As local variables exist only within a program, and by definition are not input or output from the program, in some embodiments, information about those local variables may be omitted from the dependency information stored, such as in metadata repository 110 (FIG. 1A). Nonetheless, this local dependency information may be initially captured and used in processing to derive dependency information that is stored.

FIG. 4 provides an example of such processing, performed at the backend after language dependent processing is completed. The processing is shown being performed by one or more tools that are language independent. Each of the lowering modules, such as 316, 336 or 356 may output dependency data sets 318, 338, 358 in a common format such that subsequent processing may be language independent.

In the example of FIG. 4, processing on the dependency data sets 318, 338, 358 may begin with dependency processing module 410, which may operate on both local and global dependencies. Processing may create lists or other suitable representation of dependencies of all variables, discussed above in connection with FIG. 3D. In some embodiments, dependencies for and/or on local and external variables may be stored. However, in some embodiments, more efficient operation of a data processing system may be achieved by removing such local dependencies that are not ultimately used.

Accordingly, further processing may be performed by module 420 that propagates local dependencies. Module 420 propagates and then removes local dependencies. Local dependencies may be identified as variables whose values are used only in processing within an internal scope of a program and are not loaded from or stored in an external data source. As a specific example, in Example 11, above, the values of "s" and "t" in function "g( )" are not stored or accessed from an external data source. Rather, the values of s and t are derived only from "x". Once processing is completed as described above, any target data element that depends on "s" or "t" need only indicate that it depends on "x". Accordingly, references to local variables such as "s" or "t" may be deleted without loss of information. Similarly, data representing data dependencies for "s" or "t" might also be deleted, because it is not be used in some embodiments. This information, tied only to local dependencies, may be deleted by module 420.

Module 420 may identify local variables by traversing the data stored for a program to determine whether that variable exists external to the program or is just used in an internal computation. As described above in connection with FIG. 3C, information about a program may be stored in a way that records scope information about blocks of code. That scope information may reveal the nesting as a result of code, having an inner scope, being indicated as having been defined within other code having an outer scope.

Accordingly, module 420 may begin processing at each inner-most scope. Module 420 may, for each variable defined and/or used within that scope, determine whether the variable is accessed externally of that scope. If not, that variable may be flagged as a local variable. If a variable identified as a local variable depends on one or more variables, the values of those variables may be substituted for the local variable as a source in any dependency construct.

In some instances, such processing will result in replacing a local variable an external variable as a source of a dependency. However, in some instances, a local variable may depend on another local variable. To account for such a possibility, processing by module 420 may be performed recursively, such that, in instances in which a local variable depends on other local variables, those other local variables will then be processed until all local variables within that scope are replaced by external variables in expressions of dependencies.

This process of "propagating" local dependencies may be repeated for each outer scope, with nested scopes being processed in turn from inner-most to outer-most. It will be appreciated that a complicated program may have many portions that create independent nestings of scope. Each nesting may be processed in turn, until the entire program is processed, replacing dependencies on local variables with the external variables on which those local variables in turn depend.

Upon completing this processing of propagating local dependencies, unless dependencies of local variables are to be retained, information about the dependencies for local variables may no longer be needed. Accordingly, module 420 may delete dependency information for local variables or otherwise store the retained dependency information in a way that information about local dependencies is not subsequently processed.

Loader module 430 may store the retained dependency information in metadata repository 450. In the embodiment illustrated in FIG. 4, the metadata repository is indicated as separately storing data dependencies 452 and control dependencies 454. However, as noted above, such information may be stored in the same data structure, with flow control dependencies marked separately from data flow dependencies. Alternatively, in some embodiments, no distinction may be made as between data flow and control flow dependencies.

Loader module 430 may convert the representation of dependency information, such as was discussed above in connection with FIG. 3C into the format of metadata repository 450. As a specific example, metadata repository 450 may store dependency information as a table or collection of lists indicating for each target variable the source variables on which it depends. That information may be stored in a way that allows the data processing system to generate a data lineage diagram 200 (FIG. 2).

Additionally, loader module 430 may store code summaries 456 in metadata repository in some embodiments. As described above, when source code statements producing a dependency are identified, they may be stored in connection with a dependency construct in a dependency data set, either alone or in combination with statements that might reveal information about that dependency. This code information may be stored, in whole or in part, as the code summaries 456. For example, a program may contain multiple instances in which a value is assigned to a variable. In some embodiments, loader module 430 may store code associated with each of these instances. Alternatively, or additionally, loader module 430 may selectively store code associated with only some of these instances. Loader module 430, for example, may be programmed to select code associated with the first instance of such an assignment, or the first instances until the code summary reaches a predetermined size, or may apply rules or coded heuristics to select the instances most likely to be accessed by a developer. However, such a selection may be made by loader module 430 in any suitable way to limit the size of each code summary. Alternatively or additionally, such a selection may be made by a lowering module as described in connection with FIG. 3A or in any other suitable component.

Regardless of how the selection is made, storing an identification of the code that might have given rise to a dependency for a data element or particular code block may enable a data processing system to provide additional functions to developers, such as user 102 (FIG. 1A). Code summaries 456, for example, may be used by a programmer modifying or debugging a program, seeking to understand how a variable with an unexpected value was assigned that value.

Figure 5:
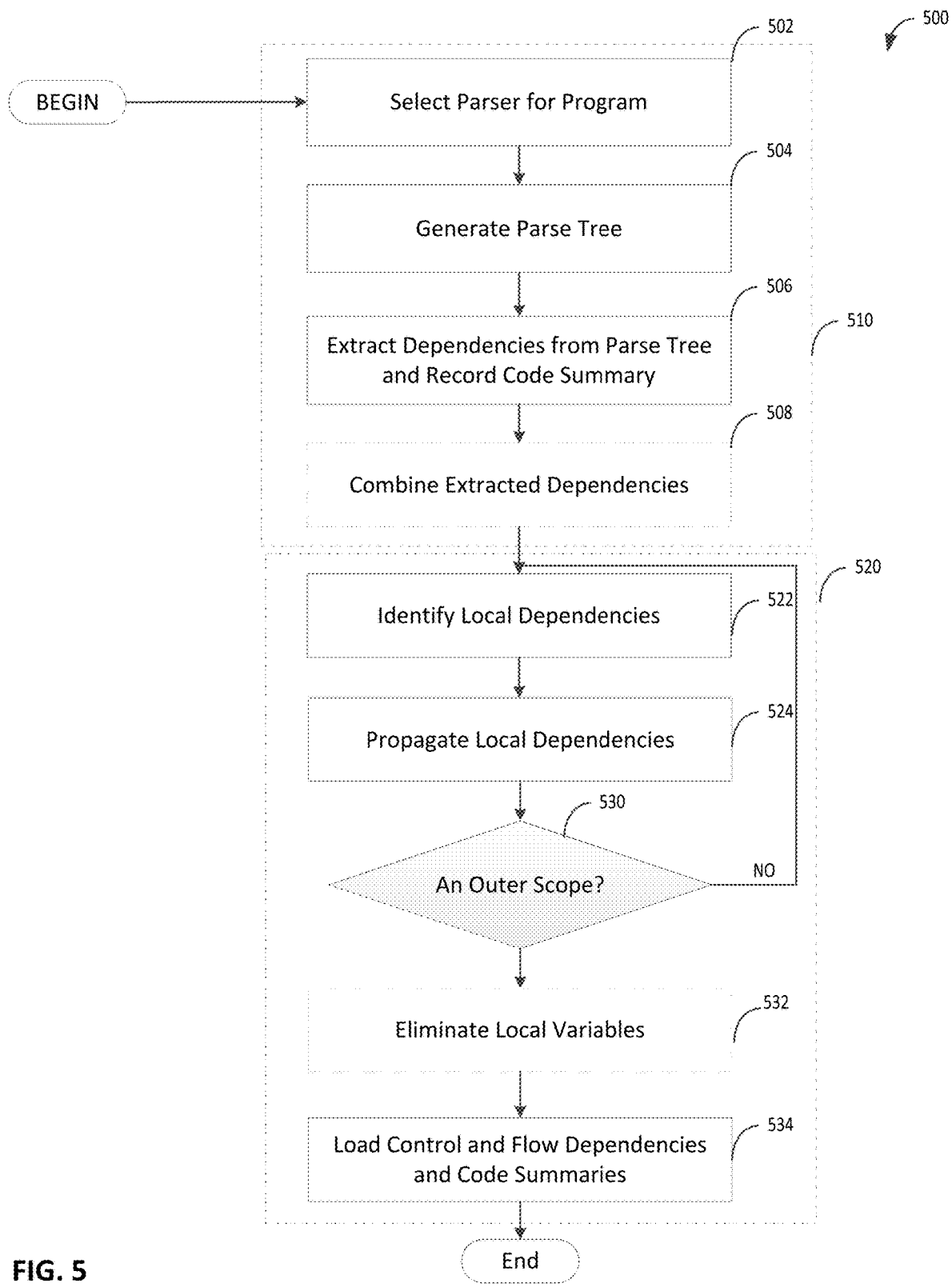
FIG. 5 is a flow chart of processing to produce a dependency metadata structure according to techniques described herein.

FIG. 5 is a flowchart of an illustrative process 500 for generating dependency information, in accordance with some embodiments of the technology described herein. Process 500 may be performed by any suitable system and/or computing device(s) and, for example, may be performed by data processing system 105 described with reference to FIG. 1A, programmed with modules as described above in connection with FIG. 3A and FIG. 4.

Process 500 begins with front end processing 510. Front end processing 510 may be performed for each program that is to be used to configure a data processing system.

Within front end processing 510, processing begins at act 502 where a parser for the program being processed is selected. A parser may be selected based on the programming language of the specific program being processed. In accordance with some embodiments, a data processing system may store parsers for each programming language that the data processing system supports. In other embodiments, the data processing system may contain a parser generator capable of generating parsers for any such programming language, and the data processing system may be configured to process programs written in a desired language by providing a grammar file or other information about that programming language used by the parser generator.

At act 504, the selected parser may be used to parse the program. The result of act 504 may be a parse tree for the program.

At act 506, the parse tree may be lowered. As described above, lowering the parse tree may be performed by a lowering module configured for the programming language of the program being processed. The result of the act of lowering may be a data structure storing dependency constructs for data elements and code blocks within the program.

At act 508, the dependency data sets, generated for all of the programs (such as programs 109, FIG. 1A) optionally may be combined, if necessary. In some embodiments, programs written in one language may call functions or otherwise incorporate code written in another programming language to implement an overall data processing function. Accordingly, parse trees generated by processing each program independently may be combined to represent such operations. The combined dependency data sets may be the output of the frontend passed to backend processing 520. Alternatively or additionally, parse trees prepared for different programs may be combined during back end processing by identifying, for each target variable, source variables on which that variable may depend, regardless of which program contains statements creating those dependencies.

Within backend processing 520, processing begins at act 522. In act 522, local dependencies are identified. For a program that has nested scopes, this processing may be performed first for each portion of the program that represents an inner-most scope. Identification of local variables may be performed in any suitable way, such as by accessing a table, which may be built during the parsing operation, for each variable. That table may indicate where the variable is accessed or modified such that variables that are accessed or modified only with the scope being processed may be identified as variables local to that scope.

At act 524 local dependencies may be propagated. Propagation of local dependencies may involve substituting, for dependencies based on local variables, dependencies on external variables on which the local variables depend.

The process proceeds to decision block 530, where the process branches, depending on whether the scope being processed is an outer scope. If not, the process branches back to act 522 where the acts of identifying and propagating local variables are repeated. In this way, portions of the program, starting at the inner-most scopes and proceeding to the outer-most of scopes are processed.

Once all of the outer-most scopes are reached, processing branches to act 532. At act 532 dependency information about local variables may be deleted.

At act 534, the remaining information may be stored in a metadata repository or stored in any other suitable location for later use.

Figure 6:
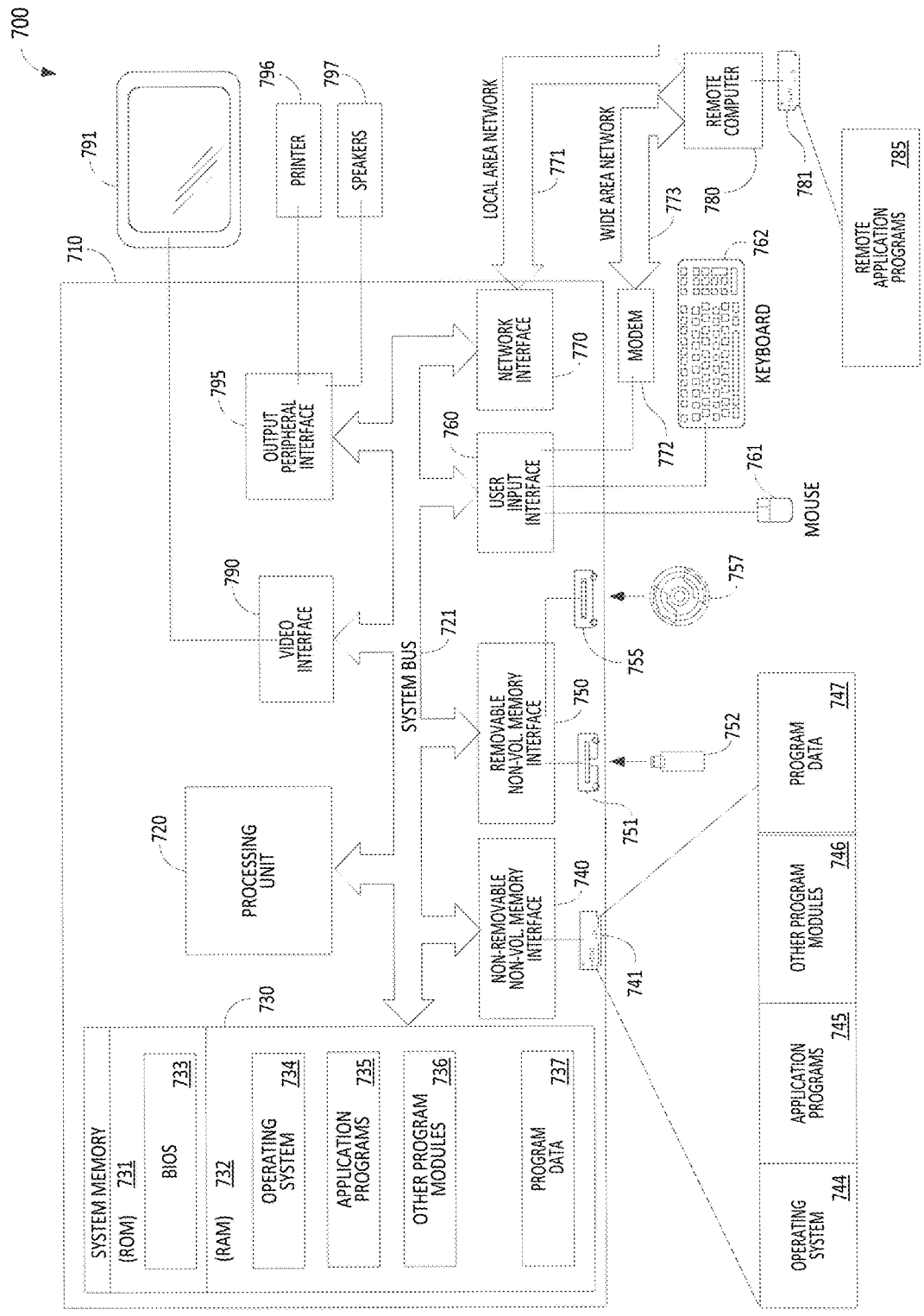
FIG. 6 is a functional block diagram of a computing system in which processing as described herein may be performed.

Process 500, illustrated in FIG. 5, may be executed in any suitable computing system environment. FIG. 6 illustrates an example of a suitable computing system environment 700 on which the technology described herein may be implemented. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A dependency analyzer for use with a data processing system, wherein the data processing system is configured to execute programs in multiple computer programming languages that access a plurality of records comprising fields, and the dependency analyzer is configured to perform dependency analysis of programs in the multiple computer programming languages, the dependency analysis comprising computing dependency information relating to field-level lineage across programs in the multiple computer programming languages, the dependency analyzer comprising:
a front end configured to process a plurality of programs controlling the data processing system, wherein the plurality of programs are written in a plurality of programming languages of the multiple programming languages, and wherein the front end comprises a plurality of front end modules, each front end module configured to receive an input of a computer program of the plurality of programs written in a programming language of the plurality of programming languages and to generate and output a language-independent data structure representing dependencies on fields of the plurality of records created within the computer program, wherein, said language-independent data structure is comprised of one or more dependency constructs, wherein generating the language-independent data structure comprises:
parsing the input program to produce a parse tree that comprises information related to dependencies, wherein the information is represented by constructs from the one or more dependency constructs, wherein each dependency construct of the one or more dependency constructs includes an indication of at least one field and a dependency related to the at least one field; and
a back end configured to receive language independent data structures output from the plurality of front end modules and to output dependency information for the data processing system representing dependencies created within the plurality of programs, wherein the dependency information comprises field-level dependencies introduced in multiple programs of the plurality of programs such that the dependency information comprises field-level lineage across the plurality of programs.

2. The dependency analyzer of claim 1, wherein:
the dependency information represents data flow dependencies.

3. The dependency analyzer of claim 1, wherein:
the dependency information represents control flow dependencies.

4. The dependency analyzer of claim 1, further comprising:
a first tool configured to load the dependency information in a metadata repository; and
a second tool configured to receive as input an indication of a field used by the data processing system, access the metadata repository and output indications of programs of the plurality of programs that introduce a dependency impacting the indicated field.

5. The dependency analyzer of claim 1, wherein:
the data processing system further comprises a plurality of data sources;
the plurality of programs are configured to perform transformations on data in the plurality of data sources; and
the plurality of data sources are heterogeneous.

6. The dependency analyzer of claim 5, wherein:
the plurality of data sources comprise data sources that are at least one of an ORACLE database or an SAP database or a dataset stored in the HADOOP Distributed File System.

7. A dependency analyzer for use with a data processing system, wherein the data processing system is configured to execute programs in of multiple computer programming languages that access a plurality of records comprising fields, the dependency analyzer comprising:
at least one computer hardware processor; and
at least one non-transitory computer-readable storage medium storing processor executable instructions that, when executed by the at least one computer hardware processor, cause the at least one computer hardware processor to perform dependency analysis of the programs in the multiple computer programming languages, the dependency analysis comprising computing dependency information relating to field-level lineage across the programs in the multiple computer programming languages, said computing comprising:
accessing a plurality of programs written in a plurality of programming languages of the multiple programming languages;
generating, for each of the plurality of programs, a language-independent data structure representing dependencies on fields of the plurality of records created within a respective program of the plurality of programs, wherein said language-independent data structure is comprised of one or more dependency constructs, wherein generating the language-independent data structure comprises:
parsing the input program to produce a parse tree that comprises information related to dependencies, wherein the information is represented by constructs from the one or more dependency constructs, wherein each dependency construct of the one or more dependency constructs includes an indication of at least one field and a dependency related to the at least one field; and generating dependency information for the data processing system representing dependencies created within the plurality of programs, wherein the dependency information comprises field-level dependencies introduced in multiple programs of the plurality of programs such that the dependency information comprises field-level lineage across the plurality of programs.

8. The dependency analyzer of claim 7, wherein:
the dependency information represents data flow dependencies.

9. The dependency analyzer of claim 7, wherein:
the dependency information represents control flow dependencies.

10. The dependency analyzer of claim 7, wherein computing dependency information further comprises:
loading the dependency information in a metadata repository; and
accessing the metadata repository and generating indications of programs of the plurality of programs that introduce a dependency impacting an identified field used by the data processing system.

11. The dependency analyzer of claim 7, wherein:
the data processing system further comprises a plurality of data sources;
the plurality of programs are configured to perform transformations on data in the plurality of data sources; and
the plurality of data sources are heterogeneous.

12. The dependency analyzer of claim 11, wherein:
the plurality of data sources comprise data sources that are at least one of an ORACLE database or an SAP database or a dataset stored in the HADOOP Distributed File System.

13. A method of dependency analysis for a data processing system configured to execute programs in multiple computer programming languages that access a plurality of records comprising fields, the method comprising:
performing, by at least one computer hardware processor, dependency analysis of the programs in the multiple computer programming languages, the dependency analysis comprising computing dependency information relating to field-level lineage across the programs in the multiple computer programming languages, said computing comprising:
accessing a plurality of programs written in a plurality of programming languages of the multiple programming languages;
generating, for each of the plurality of programs, a language-independent data structure representing dependencies on fields of the plurality of records created within a respective program of the plurality of programs, wherein said language-independent data structure is comprised of one or more dependency constructs, wherein generating the language-independent data structure comprises:
parsing the input program to produce a parse tree that comprises information related to dependencies, wherein the information is represented by constructs from the one or more dependency constructs, wherein each dependency construct of the one or more dependency constructs includes an indication of at least one field and a dependency related to the at least one field; and generating dependency information for the data processing system representing dependencies created within the plurality of programs, wherein the dependency information comprises field-level dependencies introduced in multiple programs of the plurality of programs such that the dependency information comprises field-level lineage across the plurality of programs.

14. The method of claim 13, wherein:
the dependency information represents data flow dependencies.

15. The method of claim 13, wherein:
the dependency information represents control flow dependencies.

16. The method of claim 13, wherein computing dependency information further comprises:
loading the dependency information in a metadata repository; and
accessing the metadata repository and generating indications of programs of the plurality of programs that introduce a dependency impacting an identified field used by the data processing system.

17. The method of claim 13, wherein:
the data processing system further comprises a plurality of data sources;
the plurality of programs are configured to perform transformations on data in the plurality of data sources; and
the plurality of data sources are heterogeneous.

18. The method of claim 17, wherein:
the plurality of data sources comprise data sources that are at least one of an ORACLE database or an SAP database or a dataset stored in the HADOOP Distributed File System.

19. At least one non-transitory computer-readable storage medium storing processor executable instructions that, when executed by at least one computer hardware processor, cause the at least one computer hardware processor to perform a method of dependency analysis for a data processing system configured to execute programs in multiple computer programming languages that access a plurality of records comprising fields, the method comprising:
computing dependency information relating to field-level lineage across the programs in the multiple computer programming languages, said computing comprising:
accessing a plurality of programs written in a plurality of programming languages of the multiple programming languages;
generating, for each of the plurality of programs, a language-independent data structure representing dependencies on fields of the plurality of records created within a respective program of the plurality of programs, wherein said language-independent data structure is comprised of one or more dependency constructs, wherein generating the language-independent data structure comprises:
parsing the input program to produce a parse tree that comprises information related to dependencies, wherein the information is represented by constructs from the one or more dependency constructs, wherein each dependency construct of the one or more dependency constructs includes an indication of at least one field and a dependency related to the at least one field; and generating dependency information for the data processing system representing dependencies created within the plurality of programs, wherein the dependency information comprises field-level dependencies introduced in multiple programs of the plurality of programs such that the dependency information comprises field-level lineage across the plurality of programs.

20. The at least one non-transitory computer-readable storage medium of claim 19, wherein:
the dependency information represents data flow dependencies.

21. The at least one non-transitory computer-readable storage medium of claim 19, wherein:
the dependency information represents control flow dependencies.

22. The at least one non-transitory computer-readable storage medium of claim 19, wherein computing dependency information further comprises:
loading the dependency information in a metadata repository; and
accessing the metadata repository and generating indications of programs of the plurality of programs that introduce a dependency impacting an identified field used by the data processing system.

23. The at least one non-transitory computer-readable storage medium of claim 19, wherein:
the data processing system further comprises a plurality of data sources;
the plurality of programs are configured to perform transformations on data in the plurality of data sources; and
the plurality of data sources are heterogeneous.

24. The at least one non-transitory computer-readable storage medium of claim 23, wherein:
the plurality of data sources comprise data sources that are at least one of an ORACLE database or an SAP database or a dataset stored in the HADOOP Distributed File System.

25. A dependency analyzer for use with a data processing system, wherein the data processing system is configured to execute programs in multiple computer programming languages that access a plurality of records comprising fields, and the dependency analyzer is configured to perform dependency analysis of programs in the multiple computer programming languages, the dependency analysis comprising computing dependency information relating to field-level lineage across programs in the multiple computer programming languages, the dependency analyzer comprising:

means for processing a plurality of programs controlling the data processing system, wherein the plurality of programs are written in a plurality of programming languages of the multiple programming languages, and wherein said means for processing the plurality of programs comprises a plurality of modules, each module configured to receive an input of a computer program of the plurality of programs written in a programming language of the plurality of programming languages and to generate and output a language-independent data structure representing dependencies on fields of the plurality of records created within the computer program, wherein, said language-independent data structure is comprised of one or more dependency constructs, wherein generating the language-independent data structure comprises:

parsing the input program to produce a parse tree that comprises information related to dependencies, wherein the information is represented by constructs from the one or more dependency constructs, wherein each dependency construct of the one or more dependency constructs includes an indication of at least one field and a dependency related to the at least one field; and means for receiving language independent data structures output from the plurality of modules and to output dependency information for the data processing system representing dependencies created within the plurality of programs, wherein the dependency information comprises field-level dependencies introduced in multiple programs of the plurality of programs such that the dependency information comprises field-level lineage across the plurality of programs.

* * * * *

UNITED STATES PATENT AND TRADEMARK OFFICE
CERTIFICATE OF CORRECTION

PATENT NO. : 10,817,271 B2  
APPLICATION NO. : 16/512160  
DATED : October 27, 2020  
INVENTOR(S) : Christophe Berg et al.

Page 1 of 1

It is certified that error appears in the above-identified patent and that said Letters Patent is hereby corrected as shown below:

In the Claims

Claim 7, at Column 36, Line 39. The text:
"execute programs in of multiple computer programming"

Should be replaced with:
--execute programs in multiple computer programming--

Signed and Sealed this
Twenty-ninth Day of December, 2020

Andrei Iancu
*Director of the United States Patent and Trademark Office*